US009659004B2

(12) United States Patent
Okura et al.

(10) Patent No.: US 9,659,004 B2
(45) Date of Patent: May 23, 2017

(54) RETRIEVAL DEVICE AND METHOD

(71) Applicant: FUJITSU LIMITED, Kawasaki-shi, Kanagawa (JP)

(72) Inventors: Seiji Okura, Meguro (JP); Akira Ushioda, Taito (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 14/480,237

(22) Filed: Sep. 8, 2014

(65) Prior Publication Data

US 2015/0081715 A1 Mar. 19, 2015

(30) Foreign Application Priority Data

Sep. 17, 2013 (JP) .................................. 2013-191324

(51) Int. Cl.
*G06F 17/30* (2006.01)
*G06F 17/27* (2006.01)

(52) U.S. Cl.
CPC .... *G06F 17/2785* (2013.01); *G06F 17/30616* (2013.01)

(58) Field of Classification Search
CPC ............... G06F 17/30; G06F 17/30616; G06F 17/30731; G06F 17/30684
USPC .................................................. 707/600–899
See application file for complete search history.

(56) References Cited

U.S. PATENT DOCUMENTS

| 5,933,822 A | 8/1999 | Braden-Harder et al. |
|---|---|---|
| 6,901,399 B1 | 5/2005 | Corston et al. |
| 2014/0280114 A1* | 9/2014 | Keysar ............. G06F 17/30864 707/730 |

FOREIGN PATENT DOCUMENTS

| JP | 08-006957 | 1/1996 |
|---|---|---|
| JP | 2001-084250 | 3/2001 |
| JP | 2001-142897 A | 5/2001 |
| JP | 2004-318381 | 11/2004 |
| JP | 2006-215717 A | 8/2006 |
| JP | 2008-158564 | 7/2008 |
| JP | 2010-079915 | 4/2010 |

OTHER PUBLICATIONS

JPOA—Office Action dated Apr. 4, 2017, for corresponding Japanese Application No. 2013-191324, with partial translation thereof.

* cited by examiner

*Primary Examiner* — Isaac M Woo
(74) *Attorney, Agent, or Firm* — Fujitsu Patent Center

(57) ABSTRACT

A processor performs semantic analysis on a query and generates one or more semantic structures where each structure is expressed by a graph. The processor generates retrieval keys corresponding to combinations of nodes connected directly or indirectly in the semantic structures, in addition to retrieval keys corresponding to minimum units of semantic connections between nodes in the generated semantic structures. The processor retrieves relevant documents whose sentences are matched to combinations of nodes, by using the generated retrieval keys, in the semantic structures stored in an index for retrieval on a database storing the documents.

11 Claims, 21 Drawing Sheets

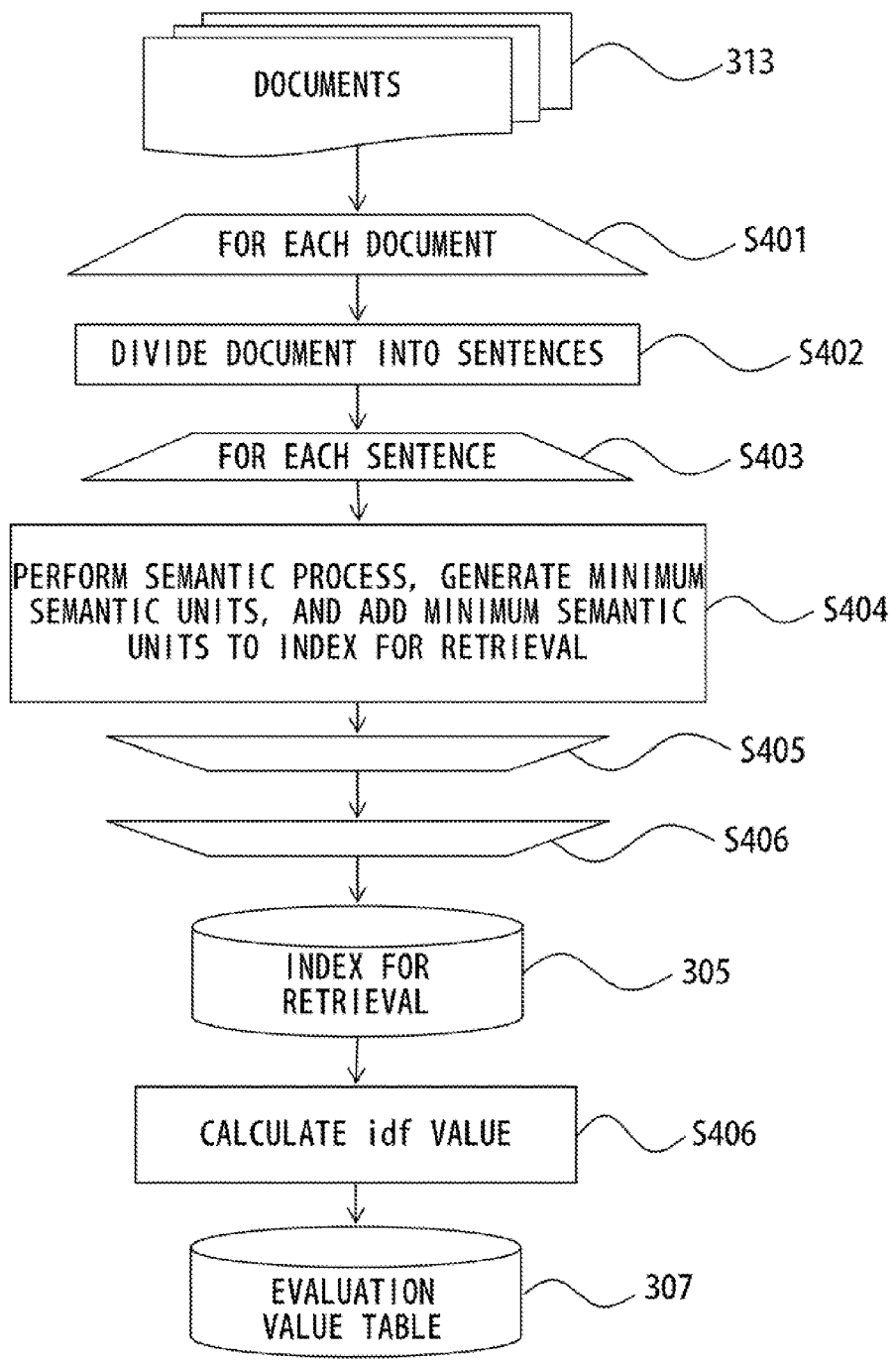
F I G. 4

| MINIMUM SEMANTIC UNIT | idf VALUE |
|---|---|
| (NIL, SEE, CENTER) | 4.634235 |
| (SEE, POSSIBLE, ASPECT) | 5.325623 |
| (SEE, GIRAFFE, OBJECT) | 6.235621 |
| (SEE, NIL, PREDICATE) | 3.235321 |

F I G. 7

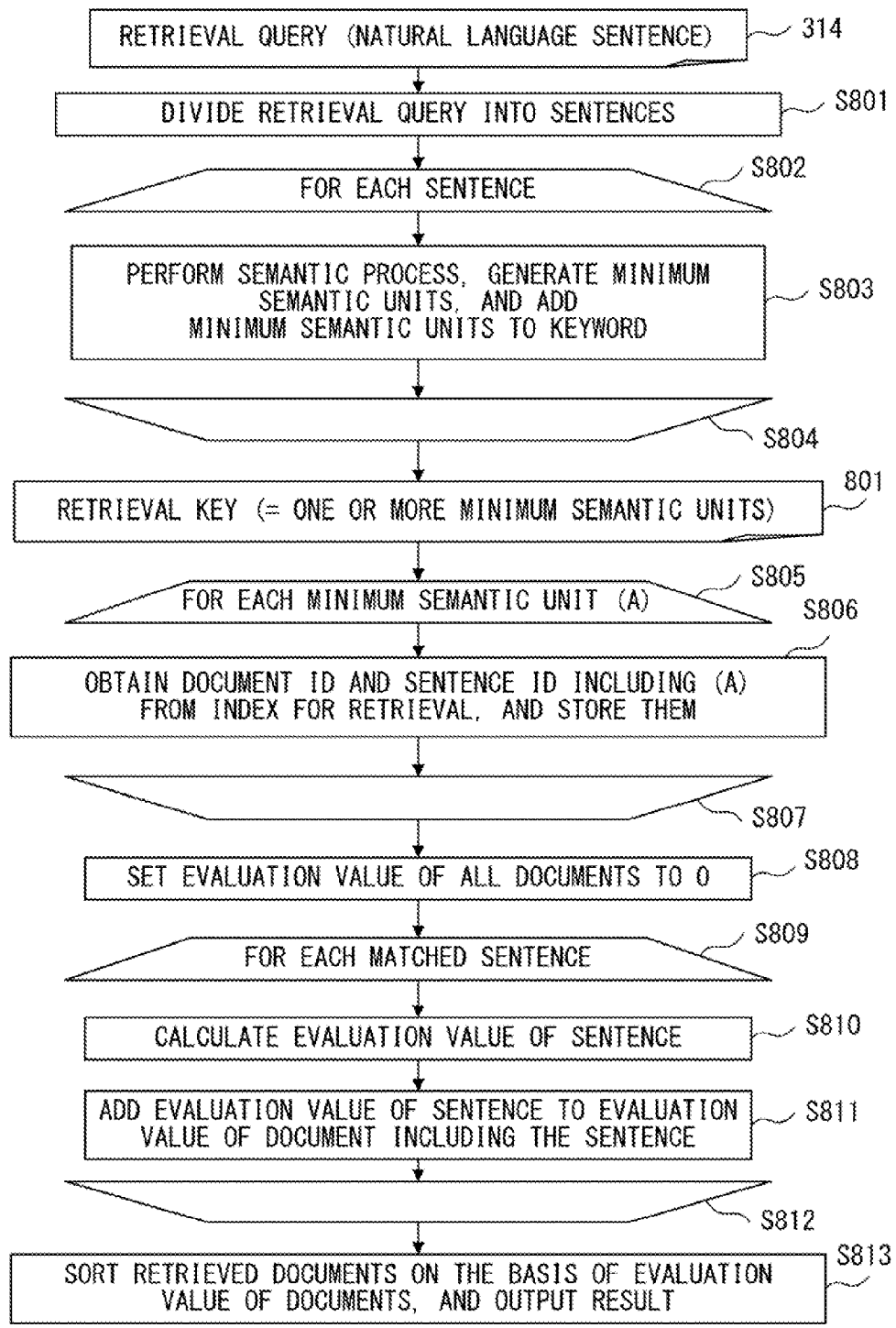
F I G. 8

CASE OF RETRIEVAL QUERY INCLUDING LARGE NUMBER OF WORDS

| NUMBER OF RETRIEVAL KEYWORDS | NUMBER OF COMBINATIONS |
|---|---|
| 10 | 10*9=90 |
| 20 | 20*19=380 |
| 30 | 30*29=870 |
| 40 | 40*39=1560 |
| n | n*(n-1) |

| ARC NAME | GROUP NAME |
|---|---|
| OBJ | OBJ_GROUP |
| OBJ_A | OBJ_GROUP |
| PP | PP_GROUP |
| LOC | PLACE_GROUP |
| PLACE | PLACE_GROUP |
| PLACE_A | PLACE_GROUP |
| ⋮ | ⋮ |

FIG. 17

| ATTRIBUTE OF NODE 2 | TYPE OF ARC STARTING FROM NODE 2 | POSSIBILITY OF EXPANSION |
|---|---|---|
| NOUN ATTRIBUTE | PP_GROUP | IMPOSSIBLE |
| VERB ATTRIBUTE | PP_GROUP | POSSIBLE |
| : | : | : |
F I G. 19 A
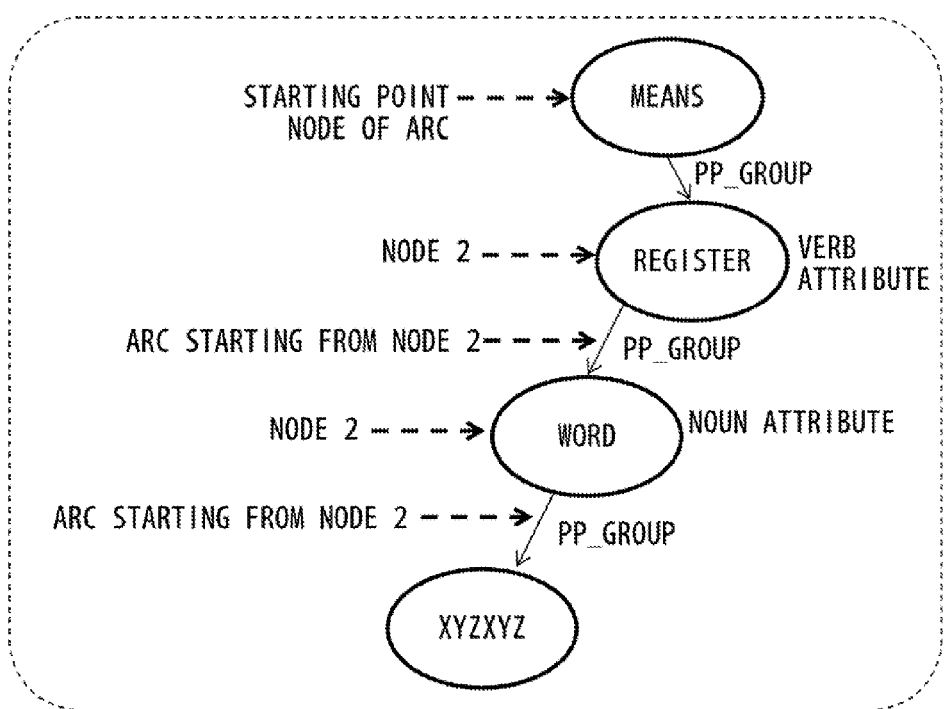
F I G. 19 B

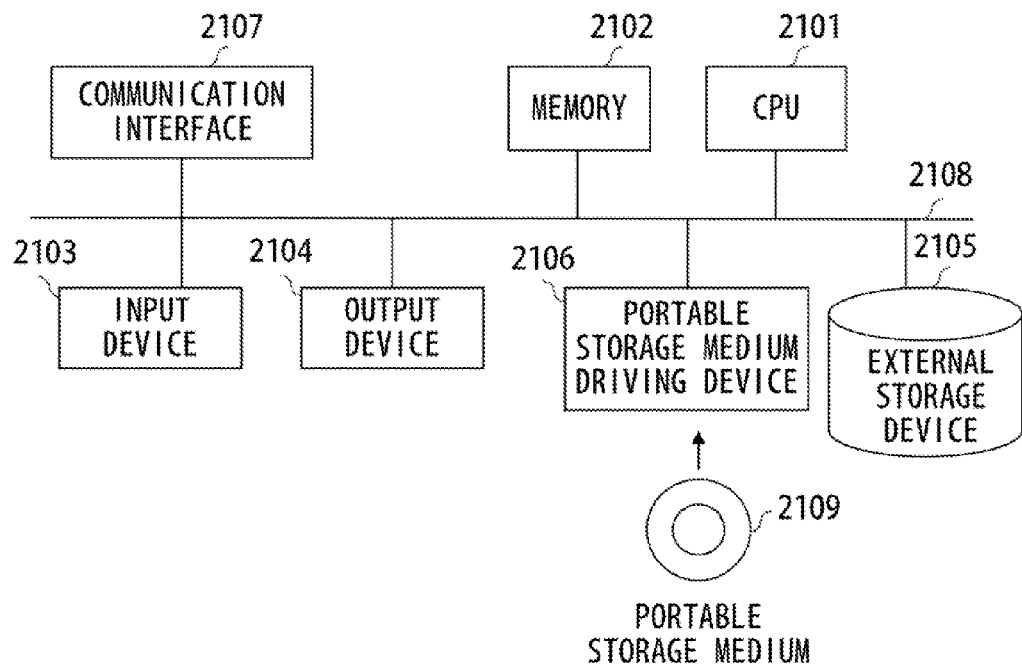
F I G. 21

RETRIEVAL DEVICE AND METHOD

CROSS-REFERENCE TO RELATED APPLICATION

This application is based upon and claims the benefit of priority of the prior Japanese Patent Application No. 2013-191324, filed on Sep. 17, 2013, the entire contents of which are incorporated herein by reference.

FIELD

The embodiments discussed herein are related to a retrieval device and a retrieval method.

BACKGROUND

In retrieval with a keyword that is applied to, for example, retrieval of an article or a patent, or retrieval of a general Web page, a retrieval query in keyword units is used, and therefore it is not possible to include a relationship between keywords in retrieval conditions. As an example, when a user retrieves "a technology for reducing an environmental load by reducing heat radiation", the user inputs the keywords "heat radiation, environmental load, reduce". However, a retrieval query using these keywords includes equivocality. In this case, the retrieval query includes both of the meanings of "reduce heat radiation" and "reduce an environmental load", and is not limited to one of the meanings. In addition, the retrieval query does not specify a relationship between heat radiation and an environmental load.

As one technology for improving retrieval accuracy is known (see Patent Document 1). A language analyzing means analyzes the language of an input retrieval request, and extracts a noun phrase including plural words and a word that is an element of retrieval conditions. A retrieval condition generating means combines the extracted words and the noun phrase by a prescribed operator, and applies a prescribed weight to each of the word and the noun phrase so as to generate a retrieval condition. A document retrieving means extracts a document matched to the retrieval condition generated by the retrieval condition generating means from the documents. A document retrieval result with a high accuracy is obtained by setting an appropriate retrieval condition on the basis of a word and a noun phrase extracted from a retrieval request input in a natural language as described above.

As another technology that improves retrieval accuracy is known (see Patent Document 2). A keyword extracting unit is included that extracts all keywords that are applicable as retrieval terms from retrieval request information that is an expression or sentence requesting retrieval. A synonym obtaining unit is included that obtains synonyms of the extracted keywords from a synonym dictionary. A document retrieval unit is included that specifies the keywords extracted by the keyword extracting unit and the synonyms obtained by the synonym obtaining unit so as to retrieve documents in the database. In addition, a retrieval result evaluation unit is included that evaluates, as a higher degree of priority, a document having a greater degree of modification similarity from among the documents retrieved by the document retrieval unit, wherein the degree of modification similarity indicates the degree of a relationship between a pair of words having a modification relationship included at least in the retrieval request information and a pair of words having a modification relationship included in the documents retrieved by the document retrieval unit. As a result, an information retrieval device is provided that retrieves information useful for a user at a high accuracy.

[Patent Document 1] Japanese Laid-open Patent Publication No. 2001-142897

[Patent Document 2] Japanese Laid-open Patent Publication No. 2006-215717

SUMMARY

According to one aspect of the embodiments, A retrieval device includes a processor that performs semantic analysis on a query and generates one or more semantic structures where each structure is expressed by a graph, generates retrieval keys corresponding to combinations of nodes connected directly or indirectly in the semantic structures, in addition to retrieval keys corresponding to minimum units of semantic connections between nodes in the generated semantic structures, and retrieves relevant documents whose sentences are matched to combinations of nodes, by using the generated retrieval keys, in the semantic structures stored in an index for retrieval on a database storing the documents.

It is to be understood that both the foregoing general description and the following detailed description are exemplary and explanatory and are not restrictive of the invention.

BRIEF DESCRIPTION OF DRAWINGS

FIG. 1 is a diagram explaining a semantic retrieval technology that the present embodiment is based on.

FIG. 4 is a flowchart illustrating a database generation process in a retrieval device using a basic semantic retrieval technology.

FIG. 7 illustrates an example of an evaluation value table.

FIG. 8 is a flowchart illustrating a retrieval process in a retrieval device using a basic semantic retrieval technology.

FIG. 17 illustrates an example of a correspondence relationship between an arc name and a group name.

FIGS. 19A and 19B are diagrams explaining another control method of an indirect connection.

FIG. 21 illustrates an example of a hardware configuration of a computer capable of executing a software program with a function of the present embodiment.

DESCRIPTION OF EMBODIMENTS

Embodiments of the present invention are described below in detail with reference to the drawings.

Keyword retrieval including equivocality in a retrieval query as described above has the following problems.
(1) Retrieval is not performed as intended by a user.
(2) Documents that include a keyword but have not been intended are retrieved.

Particularly, problem (2) involves the shortcoming that the time and effort for finding a portion intended to be found by a user from the extracted documents is complicated. For example, even when retrieval is performed with three keywords and a sentence including all of the keywords is retrieved, the sentence may include a relationship that is not intended. Namely, even when a portion hitting the keywords is output, the portion is not always information desired by a user. Accordingly, a user wastes time on the determination for extracting a useful sentence.

In one technology, the language of an input retrieval request is analyzed, and a word and a noun phrase composed of plural words that are an element of retrieval conditions are used for a keyword for retrieval. However, this technology still does not solve problem (2) described above.

In another technology, by introducing the degree of a similarity of a modification relationship of a pair of words into retrieval, even when a document is retrieved while using synonyms and extending retrieval conditions, inappropriate retrieval candidate documents are removed, and useful information related to a keyword used by a user is obtained with a high accuracy. However, this technology has a problem wherein retrieval omission occurs with respect to a plurality of words that have no modification relationship but which are included in sentences that have similar meanings, and retrieval accuracy is not improved.

In the present embodiment, a retrieval device with a higher accuracy than that of a conventional keyword-based retrieval device is realized by performing semantic retrieval, namely, retrieval that is performed by expressing a meaning of a sentence by a graph and using the graph expression. A machine translation includes all of the elemental technologies for processing words. The machine translation performs syntax analysis by extracting words in Japanese when a Japanese/English translation is given as an example. Then, on the basis of the syntax analysis result, the words are converted into a semantic structure, i.e., a structure indicating a meaning of a sentence, and a sentence in, for example, English is generated after the conversion into the semantic structure, since the semantic structure is designed to not depend on language. In semantic retrieval according to the present embodiment, retrieval is performed using a semantic structure generated by analyzing a sentence in Japanese. The semantic retrieval according to the present embodiments enables preventing the retrieval of unintended documents or the occurrence of retrieval omission.

Figure 1:
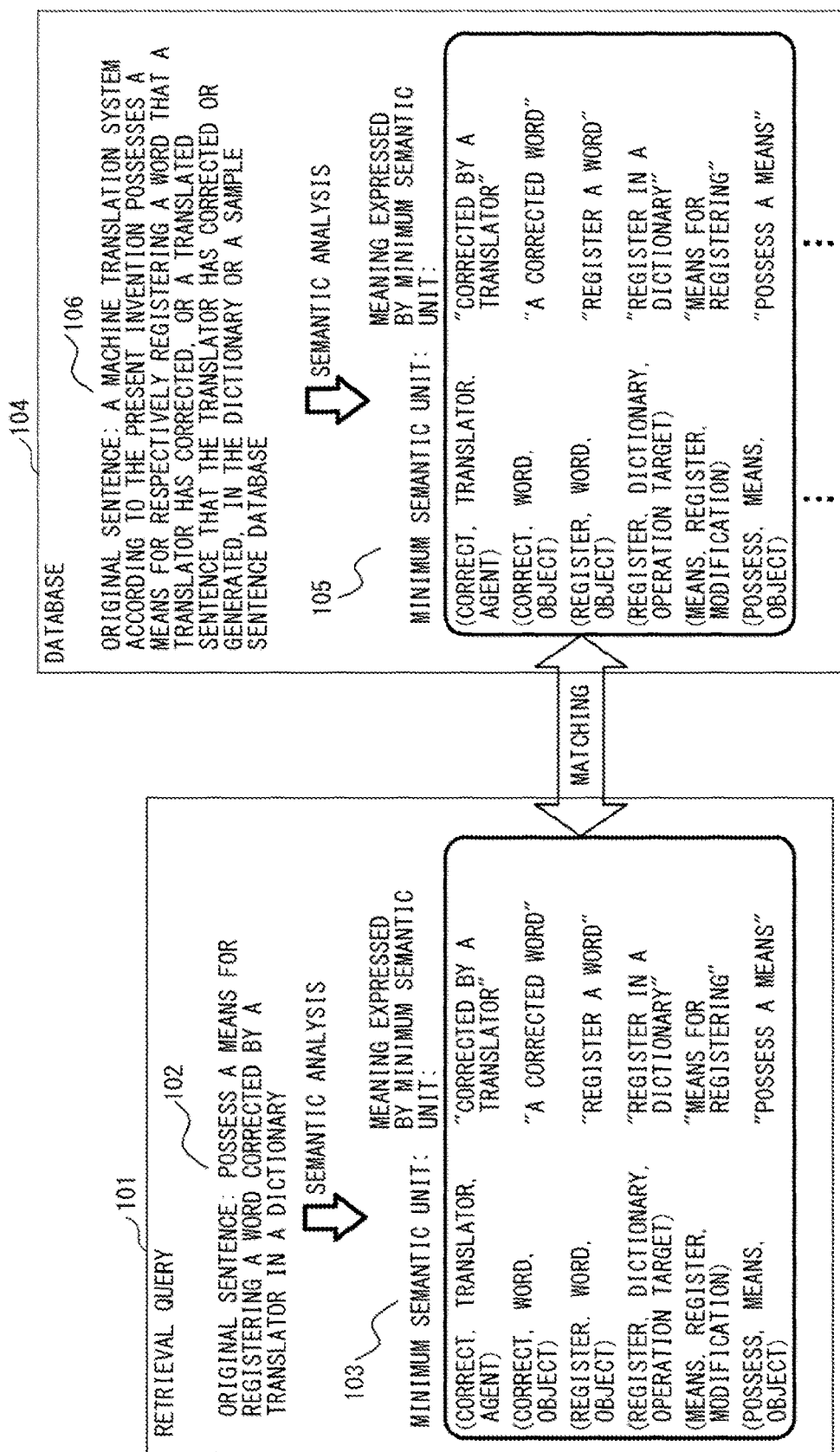

FIG. 1 is a diagram explaining a semantic retrieval technology that the present embodiment is based on. In this semantic retrieval technology, semantic analysis is performed on each sentence in documents 106, and minimum semantic units 105 are stored in advance in a database 104.

At the time of retrieval, minimum semantic units (described later) 103 corresponding to a natural language sentence (retrieval sentence) 102 of a retrieval query 101 are specified as retrieval keys. Then, the documents 106 in the database 104 that include minimum semantic units 105 and that coincide with the minimum semantic units 103 of the retrieval keys are specified, thereby retrieval intended by a retriever according to a semantic relationship between words, or the like, is performed.

Before describing the present embodiment, a basic semantic retrieval technology that the present embodiment is based on is described below. In the basic semantic retrieval technology, retrieval omission sometimes occurs even for sentences having a meaning very similar to each other, since a retrieval object is limited to narrow a range. However, the basic semantic retrieval technology is a related technology for realizing the present embodiment, and therefore this technology is first described below.

Figure 2:
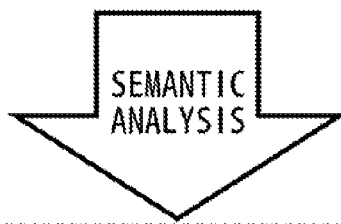
FIG. 2 is a diagram explaining a method for calculating a minimum semantic unit from a natural sentence.

FIG. 2 is a diagram explaining a method for calculating minimum semantic units from a natural sentence. As an example, when semantic analysis is performed on an original sentence 201 "Taro-wa Hanako-ni Hon-wo Ageta. (Taro gave a book to Hanako.)", a structure expressed by a directed graph 202 is obtained. This is referred to as a semantic structure. "Ageru (give)" is a central concept of this sentence. An "agent" indicating who took an action of "Ageru (give)" is "Taro", and an "object" indicating to whom the agent took the action of "Ageru (give)" is "Hanako". A "target" indicating what the agent gave to the object is "Hon (book)". As described above, in the directed graph 202, something like a dependency is expressed by a graph. "Ageru (give)", "Taro", "Hanako", and "Hon (book)" described above are words in a sentence. Semantic symbols indicated by "GIVE", "HANAKO", "TARO", and "BOOK" are respectively assigned to these words. For example, the same semantic symbol is assigned to different words having the same meaning, such as "Yu-za- (user)" and "Riyousha (user)". "Ageru" has various meanings, such as "raise one's hand" or "put something on a shelf", and in this case, different semantic symbols are assigned in accordance with the meanings. One semantic symbol does not always correspond to one word, and there are various possibilities. The directed graph 202 that is a semantic structure represents a relationship between semantic symbols.

Even a long sentence has a similar structure. A processing load of a process of matching graphs is heavy. Therefore, a graph expression is decomposed so as to be a simple structure, i.e., a minimum semantic unit.

Here, two relationships are focused on. In the directed graph 202 in FIG. 2, the arrow "OBJECT" connects "GIVE Ageru" to "HANAKO Hanako" (hereinafter, an arrow is referred to as an "arc"). The arc "AGENT" connects "GIVE Ageru" to "TARO Taro". The arc "TARGET" connects "GIVE Ageru" to "BOOK Hon". There are the other arcs, such as "PREDICATE" or "PAST" which are not connected, and these arcs represent an attribute of "GIVE Ageru". Here, being unconnected is represented by the symbol "NIL".

In the output of the minimum semantic unit, an arc is extracted from a directed graph (for example, 202 in FIG. 2), and the following processes are performed.
(1) When an arc connects two nodes:
  For each arc,
  (a node from which the arc starts, a node to which the arc is heading, a name of the arc)
  is output.

(2) When there are no nodes from which an arc starts:
For each arc,
("NIL", a node to which the arc is heading, a name of the arc)
is output.
(3) When there are no nodes to which an arc is heading:
For each arc,
(a node from which the arc starts, "NIL", a name of the arc)
is output.

The output obtained by performing the above processes (1)-(3) is defined as a "minimum semantic unit" (for example, 203 in FIG. 2).

Six decomposed portions 203 in FIG. 2 are minimum semantic units.

As described above, the minimum semantic unit represents a relationship between two concepts in a sentence or a role of the concept, and it is possible to perform the retrieval in consideration of the meanings by retrieving a database using the minimum semantic unit as a key.

The minimum semantic unit represents a partial structure of the directed graph, and matching in minimum semantic units enables more flexible retrieval than the matching of directed graphs. In addition, when an idf value described later of the minimum semantic unit is calculated (the idf value becomes larger as the number of documents including the minimum semantic unit becomes smaller), it is possible to rank retrieval results by calculating an evaluation value by using an idf value of the matched minimum semantic unit.

Figure 3:
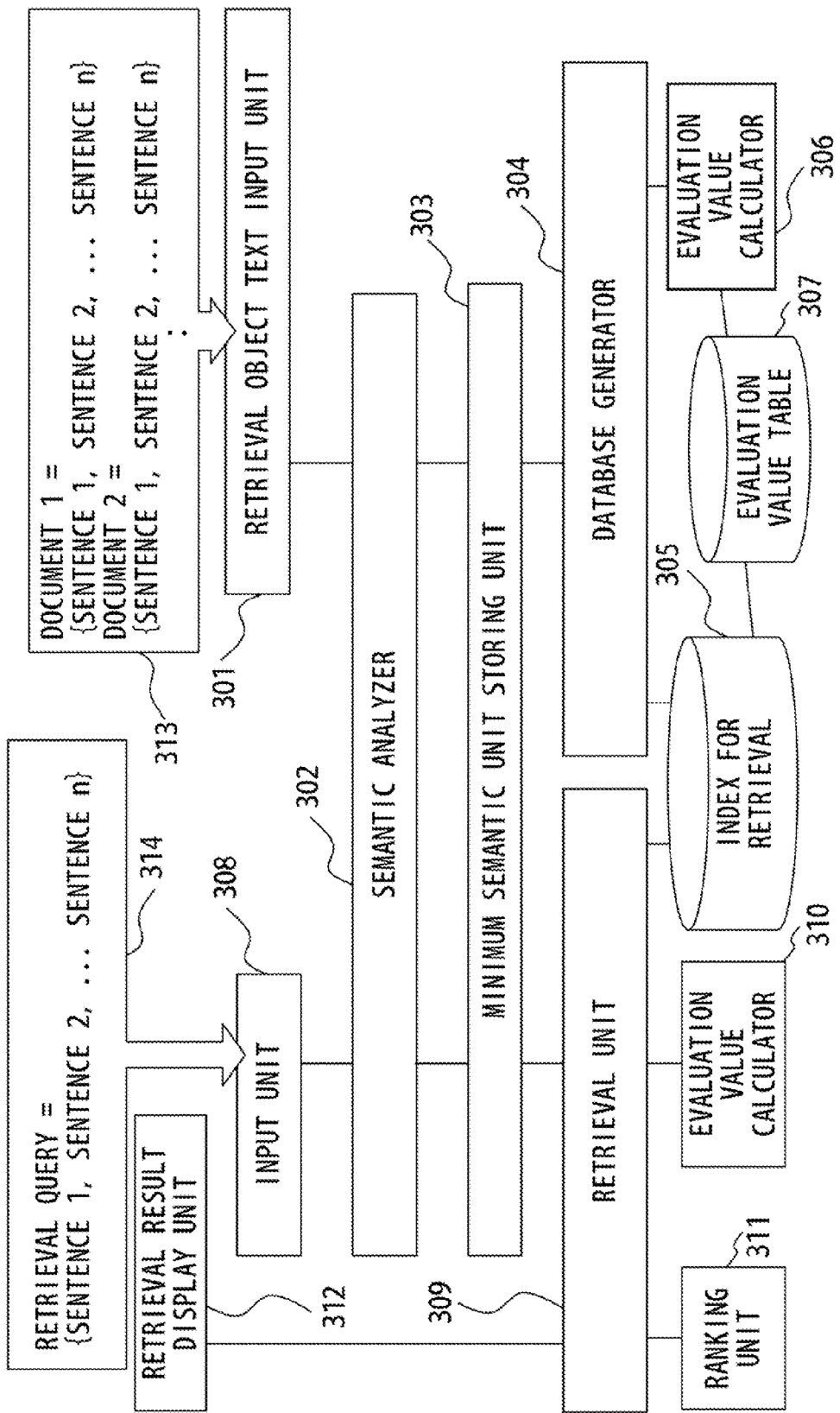
FIG. 3 illustrates a configuration of a retrieval device using a basic semantic retrieval technology.

FIG. 3 illustrates a configuration of a retrieval device using a basic semantic retrieval technology that the present embodiment is based on. The retrieval device includes, for database generation, a retrieval object text input unit 301, a semantic analyzer 302, a minimum semantic unit storing unit 303, a database generator 304, a storing unit of an index for retrieval 305, an evaluation value calculator 306, and a storing unit of an evaluation value table 307. In addition, the retrieval device includes, for retrieval execution, an input unit 308, the semantic analyzer 302 and the minimum semantic unit storing unit 303 as described above, a retrieval unit 309, an evaluation value calculator 310, a ranking unit 311, and a retrieval result display unit 312. Documents 313 are input into the retrieval object text input unit 301. A natural sentence of a retrieval query 314 is input into the input unit 308.

At the time of database generation, the retrieval object text input unit 301 receives an input of the documents 313.

The semantic analyzer 302 performs semantic analysis on the documents 313 received by the retrieval object text input unit 301. The semantic analysis refers to analyzing an input sentence (for example, 201 in FIG. 2) and representing a relationship between concepts (the meanings of words) in the input sentence by a directed graph (for example, 202 in FIG. 2), as illustrated in FIG. 2. The semantic analyzer 302 generates minimum semantic units on the basis of the directed graph.

The minimum semantic unit storing unit 303 stores the minimum semantic units generated by the semantic analyzer 302.

The database generator 304 generates the index for retrieval (database) 305 on the basis of each of the minimum semantic units included in the documents 313 that are stored in the minimum semantic unit storing unit 303. A plurality of minimum semantic units are included for each of the documents 313 in the index for retrieval 305.

The evaluation value calculator 306 calculates a document frequency (the number of documents in which the minimum semantic unit appears) for each of the minimum semantic units in the index for retrieval 305, calculates an idf value for each of the minimum semantic units from the document frequency, and stores the idf value in the evaluation value table 307. The idf value is calculated as the following.

$$idf = (\log(\text{all the number of documents}/df)) + 1 \quad (1)$$

df (document frequency): the number of documents in which the minimum semantic unit appears As an example, when a minimum semantic unit appears in 100,000 of 100,000 documents, an idf value is 1. When the minimum semantic unit appears in a smaller number of documents, an idf value becomes larger. For example, when a minimum semantic unit appears in 1 of 100,000 documents, an idf value becomes log (100,000). When a minimum semantic unit is matched on the index for retrieval 305, an idf value of the minimum semantic unit is calculated as an evaluation value, and as a result, when a rare semantic structure is hit, the rare semantic structure are displayed in an upper level of retrieval results.

The evaluation value table 307 is described by using an idf value as an example, but another value may be used.

As described above, after the index for retrieval 305 as a database and the evaluation value table 307 have been generated in advance, actual retrieval is performed.

The input unit 308 receives a natural sentence of the retrieval query 314 from a user.

The semantic analyzer 302 described above performs semantic analysis on the retrieval query 314 received by the input unit 308 so as to generate a plurality of minimum semantic units included in the retrieval query 314, and the plurality of minimum semantic units are stored in the minimum semantic unit storing unit 303.

The retrieval unit 309 retrieves the index for retrieval 305 that is a database by using the minimum semantic units that have been generated from the retrieval query 314 and have been stored in the minimum semantic unit storing unit 303.

The evaluation value calculator 310 refers to the evaluation value table 307 and the index for retrieval 305, and calculates an evaluation value from the minimum semantic unit matched by the retrieval unit 309.

The ranking unit 311 sorts an evaluation value of each document that is a retrieval result calculated by the evaluation value calculator 310, and performs ranking. The ranked result is presented to a user by the retrieval result display unit 312.

FIG. 4 is a flowchart illustrating a database generation process in a retrieval device having a configuration illustrated in FIG. 3 using a basic semantic retrieval technology.

Processes of steps S402-S405 described below are performed for each of the documents 313 (FIG. 3) by a loop process under the control of steps S401 and S406.

First, one of the documents 313 is divided into sentences (step S402).

Next, a semantic (semantic analysis) process is performed on each of the sentences obtained by the division by the loop process under the control of steps S403 and S405 so as to generate minimum semantic units, and the minimum semantic units are added to the index for retrieval 305 (FIG. 3) (step S404).

The processes above are a database generation process corresponding to the functions of the retrieval object text input unit 301, the semantic analyzer 302, the minimum semantic unit storing unit 303, and the database generator 304 in FIG. 3.

Figure 5:
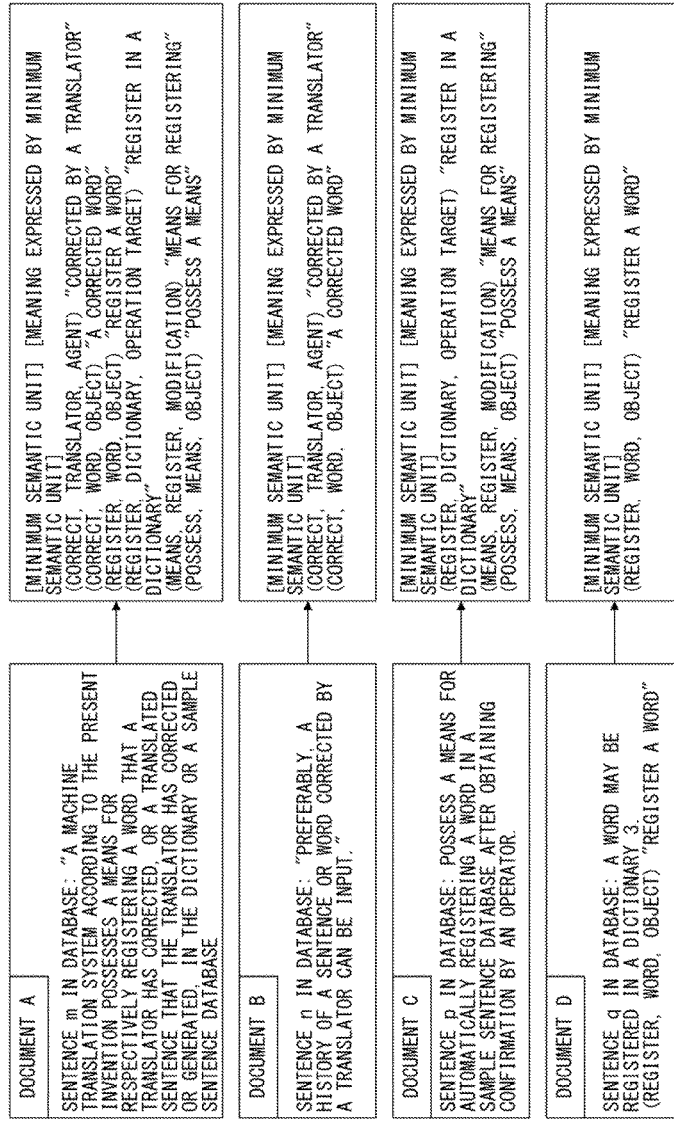
FIG. 5 illustrates an example of database generation.

FIG. 5 illustrates an example of database generation. For example, assume that the document A includes the sentence m "A machine translation system according to the present invention possesses a registration means that respectively registers a word that a translator corrected, or a translated sentence that the translator has corrected or generated, into the dictionary and an example sentence database." When semantic analysis is performed on this sentence so as to generate minimum semantic units, for example, the minimum semantic units are generated as illustrated in FIG. 5. For easy understanding, a meaning expressed by the minimum semantic unit is illustrated in FIG. 5. The generated minimum semantic units are associated with the sentence m and the document A. This information is used for an evaluation value calculation at the time of retrieval. A similar process is performed on the other sentences so as to generate minimum semantic units.

Figure 6:
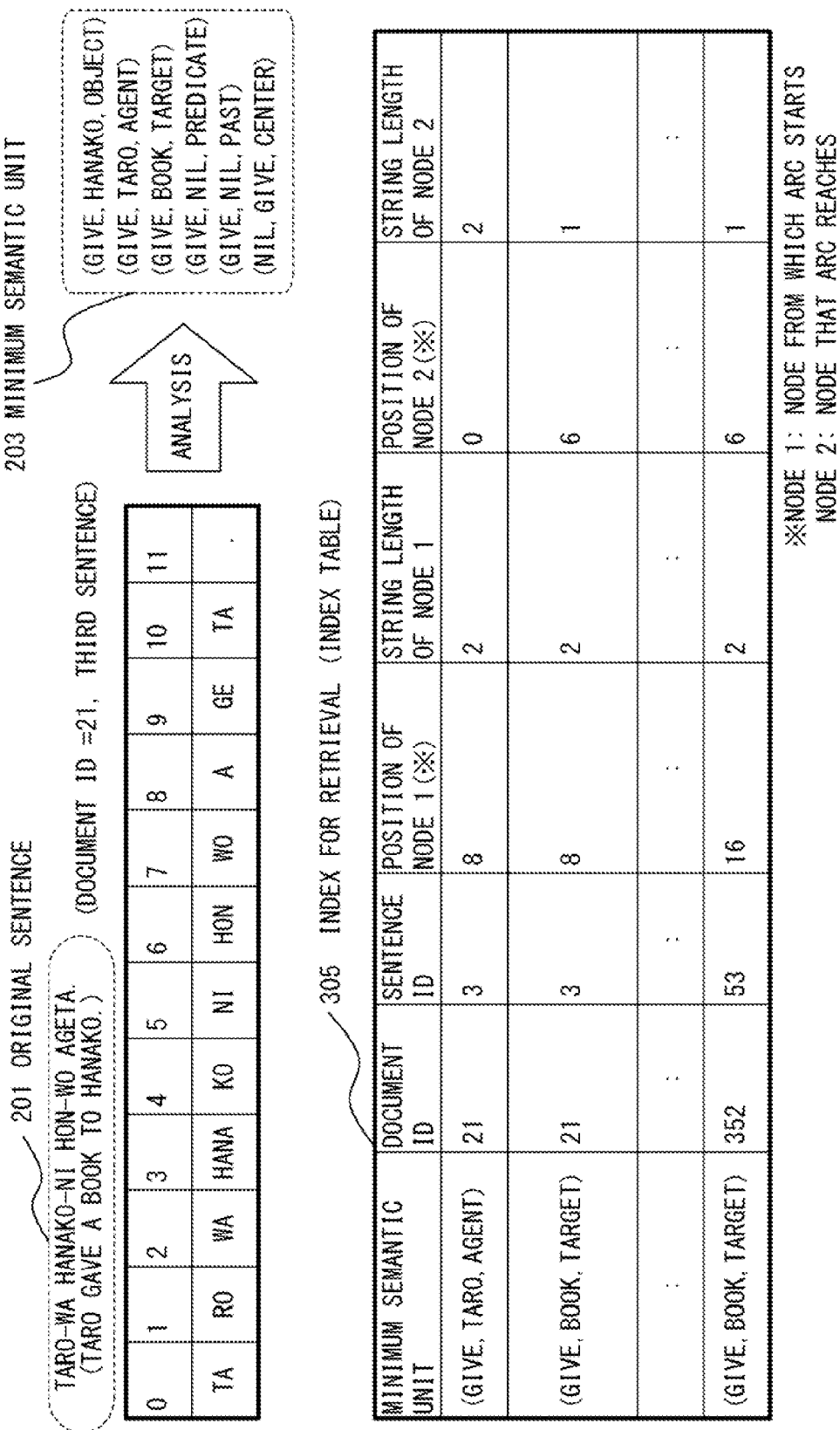
FIG. 6 illustrates an example of a minimum semantic unit stored in an index for retrieval.

FIG. 6 illustrates an example of a minimum semantic unit stored in the index for retrieval 305 (FIG. 3). The index for retrieval 305 is an index table for retrieving a document ID, a sentence ID, an appearance position, and the like, of a minimum semantic unit by using the minimum semantic unit as a key. As information of the appearance position, a position of a node 1 that is a node from which an arc starts, a string length of the node 1, a position of a node 2 that is a node that the arc reaches, and a string length of the node 2 are stored.

When a loop process of steps S403-S405 in FIG. 4 to each sentence and a loop process of steps S401-S406 to each of the documents 313 are finished and the index for retrieval 305 is generated, a process of step S406 described below is performed. An idf value is calculated for each of the minimum semantic units stored in the index for retrieval 305, and the idf value is stored in the evaluation value table 307 (FIG. 3).

FIG. 7 illustrates an example of the evaluation value table 307. An idf value is calculated for each of the minimum semantic units (see FIG. 6) in the index for retrieval 305 on the basis of expression (1) described above. In FIG. 7, the minimum semantic unit "(SEE, NIL, PREDICATE)" is an example of a minimum semantic unit that refers to "see". The term "see" generally appears in many documents, and therefore a df value in expression (1) becomes large and an idf value calculated by using the df value as a denominator becomes small. In contrast, "(SEE, GIRAFFE, OBJECT)" is an example of a minimum semantic unit that refers to "see a giraffe". The phrase "see a giraffe" does not appear in so many documents, and therefore a df value in expression (1) becomes small and an idf value calculated by using the df value as a denominator becomes large.

As described above, an idf value for each of the minimum semantic units obtained in the evaluation value table 307 becomes larger as the minimum semantic unit is rarer.

The process of generating the evaluation value table 307 as described above corresponds to a function of the evaluation value calculator 306 in FIG. 3.

FIG. 8 is a flowchart illustrating a retrieval process in a retrieval device having a configuration in FIG. 3 using a basic semantic retrieval technology.

First, a retrieval query 314 (FIG. 3) in a natural language sentence is input.

Then, the retrieval query 314 is divided into sentences (step S801).

Then, a semantic (semantic analysis) process similar to the process of step S404 of FIG. 4 is performed for each of the sentences obtained by the division by a loop process under the control of steps S802 and S804, and a result is added to a keyword of retrieval key (step S803).

The processes above correspond to functions of the input unit 308, the semantic analyzer 302, and the minimum semantic unit storage 303 in FIG. 3.

Figure 9:
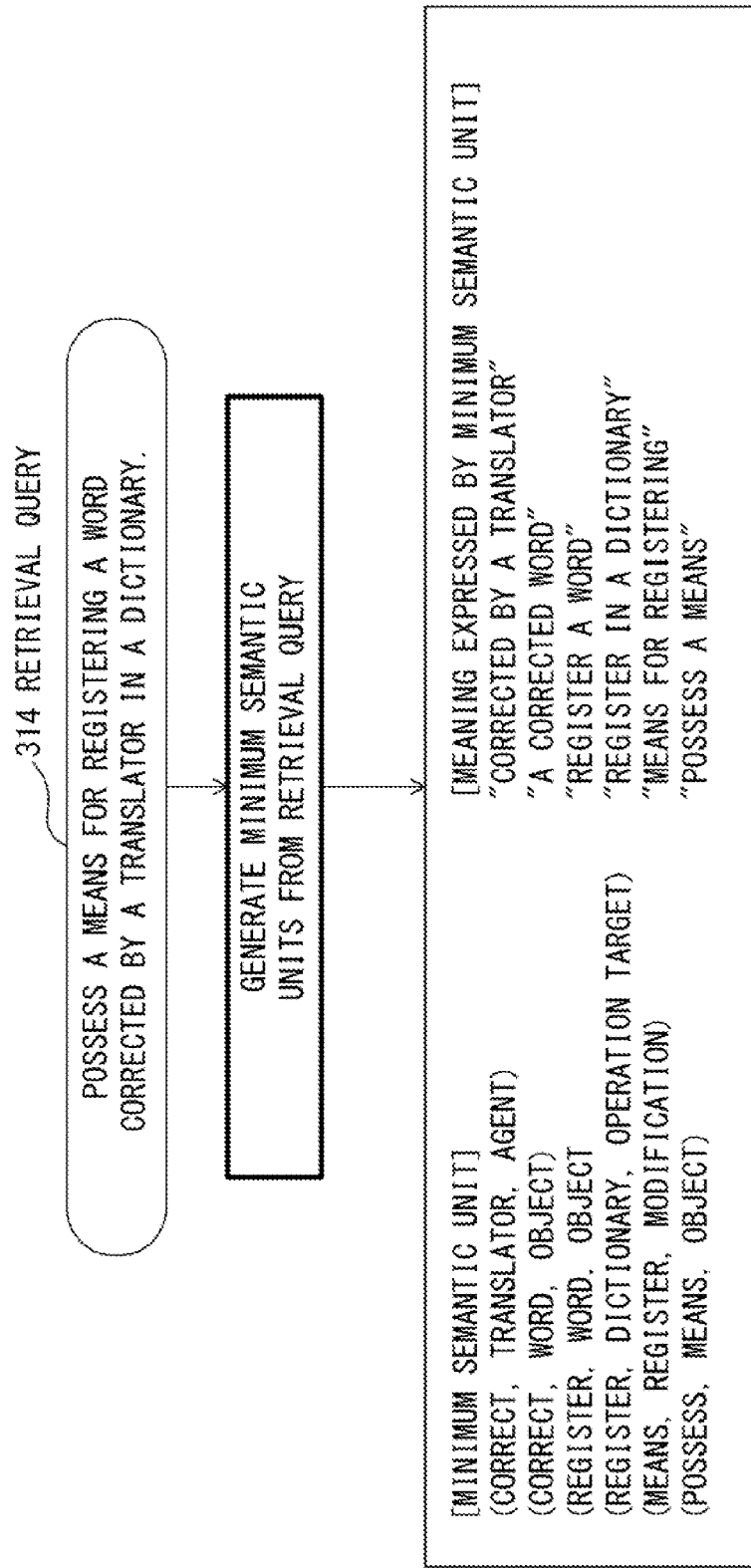
FIG. 9 is a diagram explaining the generation of a minimum semantic unit from a retrieval query.

FIG. 9 illustrates an example in which minimum semantic units are generated from an example of the retrieval query 314 "possess a means for registering a word corrected by a translator in a dictionary". From a document of the retrieval query 314 corresponding to one of the documents in FIG. 5, a plurality of minimum semantic units as illustrated in FIG. 5 are generated.

By a loop process of steps S802-S804 as described above, the minimum semantic units corresponding to the retrieval query 314 are automatically generated, and a set of the minimum semantic units is made to be retrieval keys 801.

Then, a process of step S806 described below is performed for each of the minimum semantic units (hereinafter referred to as a "minimum semantic unit (A)") included in the retrieval keys 801 by a loop process under the control of steps S805 and S807 in FIG. 8. From the index for retrieval 305 in FIG. 3 having a configuration illustrated in FIG. 6, a document ID and a sentence ID of a record (corresponding to a row in FIG. 6) including the minimum semantic unit (A) to be processed are obtained and stored. As a result of this process, it is confirmed which sentence in which document the minimum semantic unit (A) to be processed matches.

By a loop process of steps S805-S807, a document ID and a sentence ID including the minimum semantic unit are obtained for all of the minimum semantic units included in the retrieval keys 801.

The processes described below correspond to a function of the retrieval unit 309 in FIG. 3.

Next, after evaluation values of all of the documents in a database is set to 0 (step S808), an evaluation value is calculated as described below for each sentence that matches anyone of the minimum semantic units in the retrieval keys 801 in the processes above, by a loop process under the control of steps S809 and S812.

As an example, assume that four sentences illustrated in FIG. 5, i.e., the sentences m, n, p, and q, match the retrieval keys 801. By a loop process under the control of steps S809 and S812, an evaluation value is calculated for each of the sentences.

First, an evaluation value for a sentence to be processed (hereinafter, the sentence to be processed is referred to as a "sentence i") is calculated (step S810). The evaluation value (Si) for the sentence i is expressed by the following expression.

Evaluation value ($Si$) of sentence $i$=[from among a set ($K1,K2, \ldots Kj, \ldots$) of minimum semantic units of retrieval query, a sum total of ($i$df value of $Kj$ appearing in sentence $i$×the number of appearance of $Kj$ in sentence $i$)]×$M^2$        (2)

In the above expression (2), M is the number of Kj that simultaneously appears in the sentence i. It may be considered that, as the number M increases, the sentence i matches the retrieval query 314 more. It may be also considered that, as the number M increases by one, a matching degree is improved. In view of this, the square of M is multiplied in order to increase the evaluation value in accordance with the number M.

For easy understanding, assume that idf values of all of the minimum semantic units included in the retrieval keys 801 are 2.0. The sentence m illustrated in FIG. 5 matches six minimum semantic units generated from the retrieval query 314.

Each of the minimum semantic units appears in the sentence m only once. In addition, the number of minimum semantic units appearing in the sentence m is 6. In view of the foregoing, the evaluation value of the sentence m as given by expression (2) is the following.

$$(2.0*1+2.0*1+2.0*1+2.0*1+2.0*1+2.0*1) \times 6^2 = 432.0 \quad (3)$$

For the sentences n, p, and q in FIG. 5, a similar calculation is performed.

Then, an evaluation value of a document is calculated (step S811). The evaluation value of the document is calculated by the following expression.

$$\text{Evaluation value } (D) \text{ of document} = \text{a sum total of evaluation value } (Sn) \text{ of sentence } n \quad (4)$$

Namely, the evaluation value of the document is a sum total of evaluation values of all of the sentences included in the document. As a specific process, for the sentence i to be processed whose evaluation value (Si) was calculated in step S810, the evaluation value (Si) of the sentence i is added to an evaluation value of a document including the sentence i (step S811).

The above processes of step S809-S812 are repeatedly performed for each sentence i that matches any of the minimum semantic units in the retrieval keys 801, and as a result, evaluation values of each of the sentences i and a document including each of the sentences i are calculated.

The processes above correspond to a function of the evaluation value calculator 306 in FIG. 3.

Finally, documents are sorted, i.e., ranked, for example, in descending order on the basis of the evaluation values calculated as above, and the following results are obtained.

As an example, when the document A illustrated in FIG. 5 possess two sentences, the sentence m and a sentence r not particularly illustrated, and an evaluation value of the sentence r is 18.0, an evaluation value of the document A is calculated as 18.0+432.0=450.0 by adding the evaluation value of the sentence r to a value that is obtained by a calculation of the above expression (3). Assume that evaluation values are calculated similarly for documents B, C, and D so as to respectively obtain 106.0, 253.0, and 90.0. The ranking is performed, and the following retrieval results are displayed on the retrieval result display unit 312 in FIG. 3.

The first rank of the retrieval result: Document A (evaluation value=450.0)

The second rank of the retrieval result: Document C (evaluation value=253.0)

The third rank of the retrieval result: Document B (evaluation value=106.0)

The fourth rank of the retrieval result: Document D (evaluation value=90.0)

In this example, even when expressions are different from each other or another expression is inserted between words, the matching is performed on the basis of the meanings.

Sentence m: "a translator corrected" matches (CORRECT, TRANSLATOR, AGENT) ("corrected by a translator" in the retrieval query 314).

Sentence m: "respectively registering a word or . . . corrected in the dictionary or a sample sentence database" matches (REGISTER, WORD, OBJECT).

Sentence q: "A word may be registered in a dictionary 3" matches (REGISTER, WORD, OBJECT) ("word" is interpreted to be an object, not a subject, of "register").

When a user selects, for example, the document A and makes the document Abe displayed, because an evaluation value is calculated for each sentence, it is possible to highlight a sentence with a high evaluation value.

The processes above correspond to functions of the ranking unit 311 and the retrieval result display unit 312 in FIG. 3.

In the retrieval device using a basic semantic retrieval technology as described above, retrieval is performed in which minimum semantic units that are retrieval keys 801 specified from the retrieval query 314 all match a minimum semantic unit (for example, see FIG. 6) in the index for retrieval 305 (database). Therefore, since a retrieval object is limited to narrow a range, a minimum semantic unit to be originally matched is not matched and retrieval omission sometimes occurs even for a sentence having a similar meaning.

Figure 10:
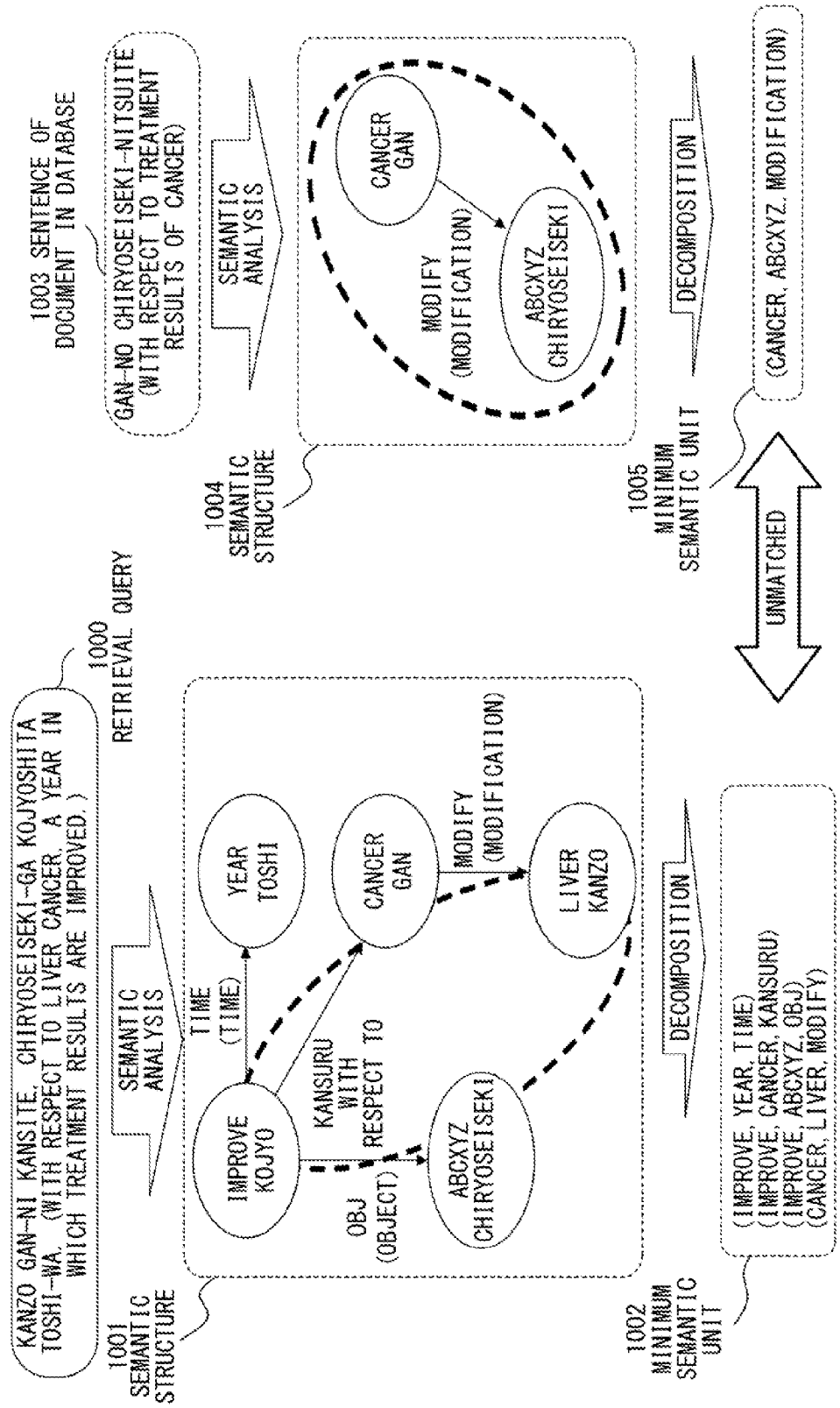
FIG. 10 illustrates an example of a retrieval omission in a retrieval device using a basic semantic retrieval technology.

FIG. 10 illustrates an example of retrieval omission in a retrieval device using a basic semantic retrieval technology.

Assume that the natural sentence "With respect to liver cancer, a year in which treatment results are improved." is input as a retrieval query 1000 and a similar document in a database is retrieved. When semantic retrieval is performed on the retrieval query 1000 so as to obtain a semantic structure 1001, and minimum semantic units are calculated, the following minimum semantic units 1002 are obtained.

(IMPROVE, YEAR, TIME)
(IMPROVE, CANCER, KANSURU)
(IMPROVE, ABCXYZ, OBJ)
(CANCER, LIVER, MODIFY)

On the other hand, assume that there is a document including the following sentence 1003 from among documents in the index for retrieval 305 (database) (FIG. 3).

" . . . with respect to treatment results of cancer . . . "

This sentence 1003 describes the treatment results of cancer, and has a meaning similar to that of the retrieval query 1000; however, a minimum semantic unit 1005 that is obtained from a semantic structure 1004 obtained by performing semantic analysis on this portion is as provided below.

(CANCER, ABCXYZ, MODIFY)

The minimum semantic unit 1005 above does not match any of the minimum semantic units 1002 in the retrieval keys. Since the semantic structures 1001 and 1004 have similar meanings, they are semantic structures that are actually desired to match. However, in the semantic structure 1001 generated from the retrieval query 1000, "CANCER" and "ABCXYZ" are not connected directly, and therefore a minimum semantic unit including these two nodes simultaneously is not generated. As a result, retrieval omission occurs.

In order to prevent the retrieval omission, a method is considered in which all of the arcs in the semantic structures 1001 and 1004 are cut temporarily, combinations with respect to all of the nodes are generated, and the matching is performed regardless of the type of arc. FIG. 11 is a diagram explaining the method above.

Figures 11A, 11B:
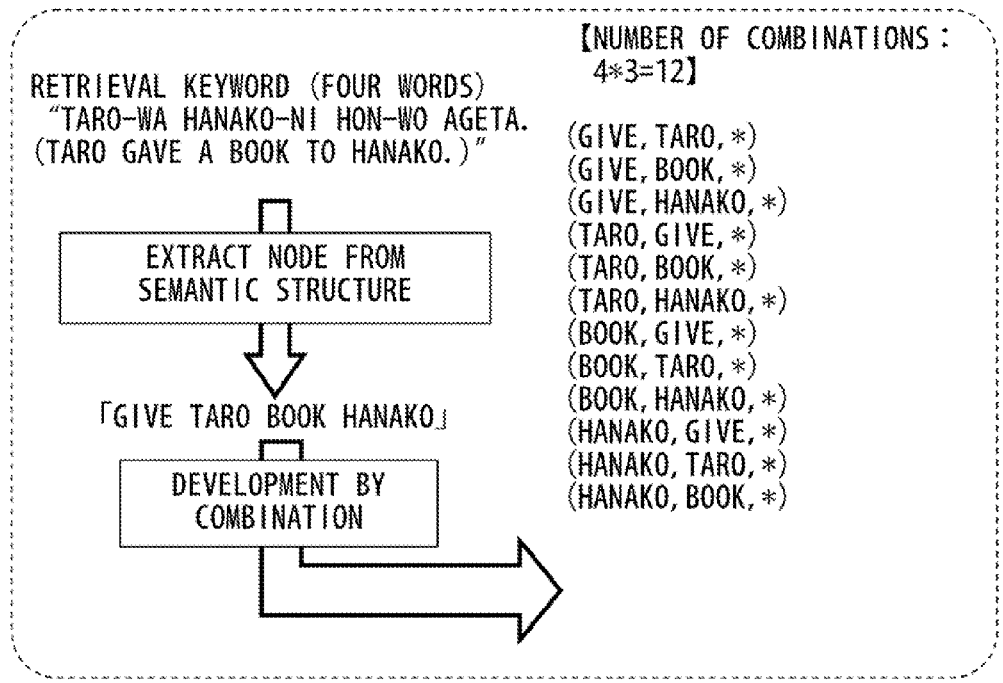
FIGS. 11A and 11B are diagrams explaining a method for preventing retrieval omission.

FIG. 11A illustrates an example of processing by the method above in a case in which retrieval keys are extracted from a sentence of a retrieval query having a small number of words, such as four words, "Taro-wa Hanako-ni Hon-wo Ageta. (Taro gave a book to Hanako.)". When nodes are extracted from a semantic structure of this sentence, "GIVE TARO BOOK HANAKO" is obtained, for example. When this is developed by combinations to minimum semantic units, 12 minimum semantic units as combinations that are obtained by multiplying 4 words by 3 are generated, as illustrated in a portion of "NUMBER OF COMBINATIONS" of FIG. 11A.

FIG. 11B illustrates results obtained by calculating the number of combinations in a case in which the number of keywords in a sentence of a retrieval query increases, for example, from 10 to n by tens. By the method above, when the number of keywords in the sentence of the retrieval query increases, the number of combinations becomes large. When the number of combinations is n, n×(n−1) combinations are generated.

Accordingly, the method above has a problem wherein it takes a large amount of time to perform retrieval to a long sentence of a retrieval query.

In addition to this problem, noise, i.e., a large number of combinations that are unintended retrieval results, is generated, and therefore a user needs to generate only a combination effective for retrieval.

The present embodiment that prevents the problems above from occurring is described below in detail.

Figure 12:
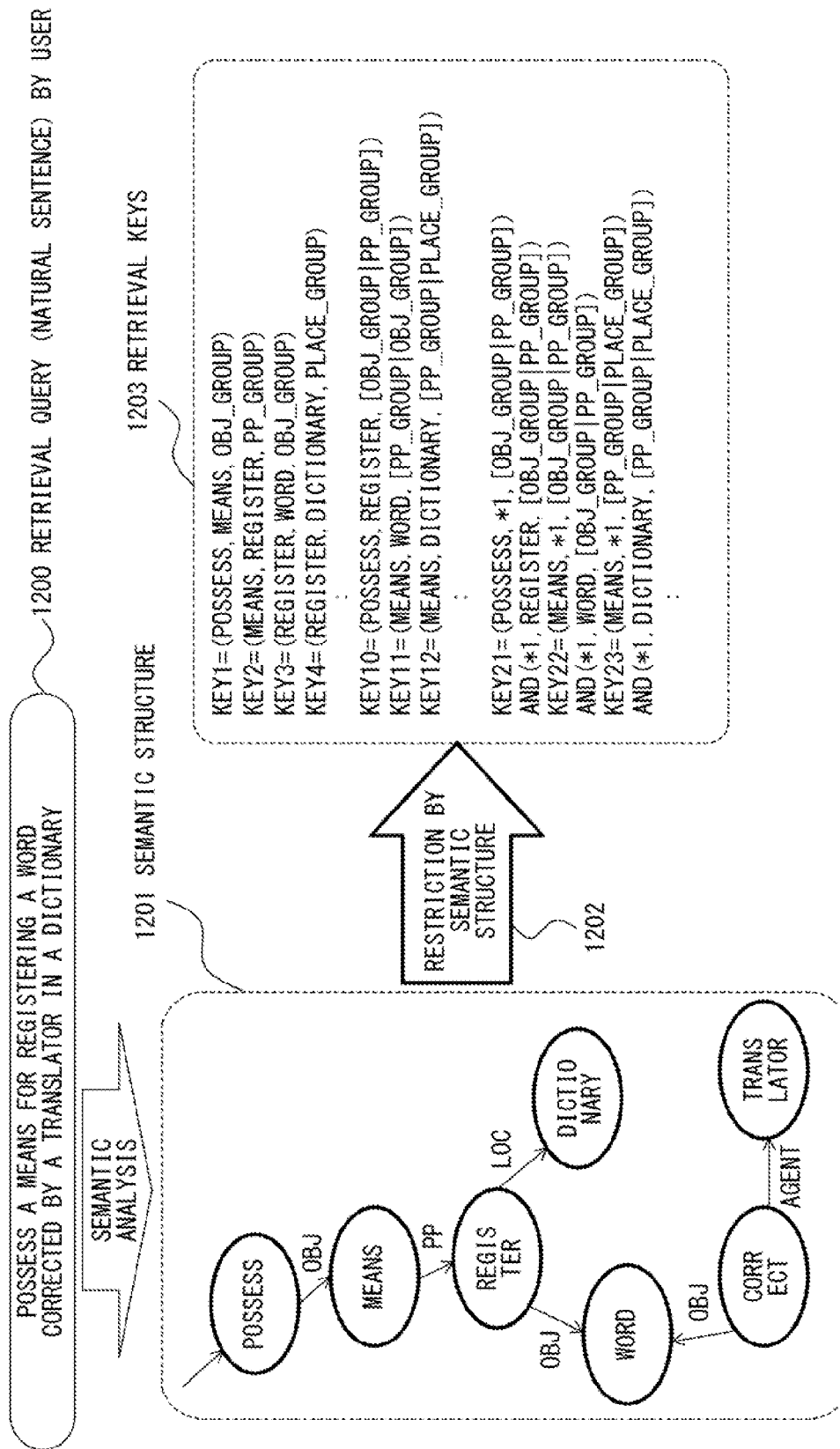
FIG. 12 is a diagram explaining the present embodiment.

FIG. 12 is a diagram explaining the present embodiment. Performing semantic analysis on a retrieval query 1200 and calculating a semantic structure 1201 are similar to the basic semantic retrieval technology described above. In the present embodiment, retrieval keys are not generated as a set of minimum semantic units, but retrieval keys are generated by imposing a restriction 1202 by a semantic structure. As a result, retrieval omission is reduced, a large number of combinations are avoided, and retrieval keys 1203 in which retrieval noise is suppressed are generated.

Figure 13:
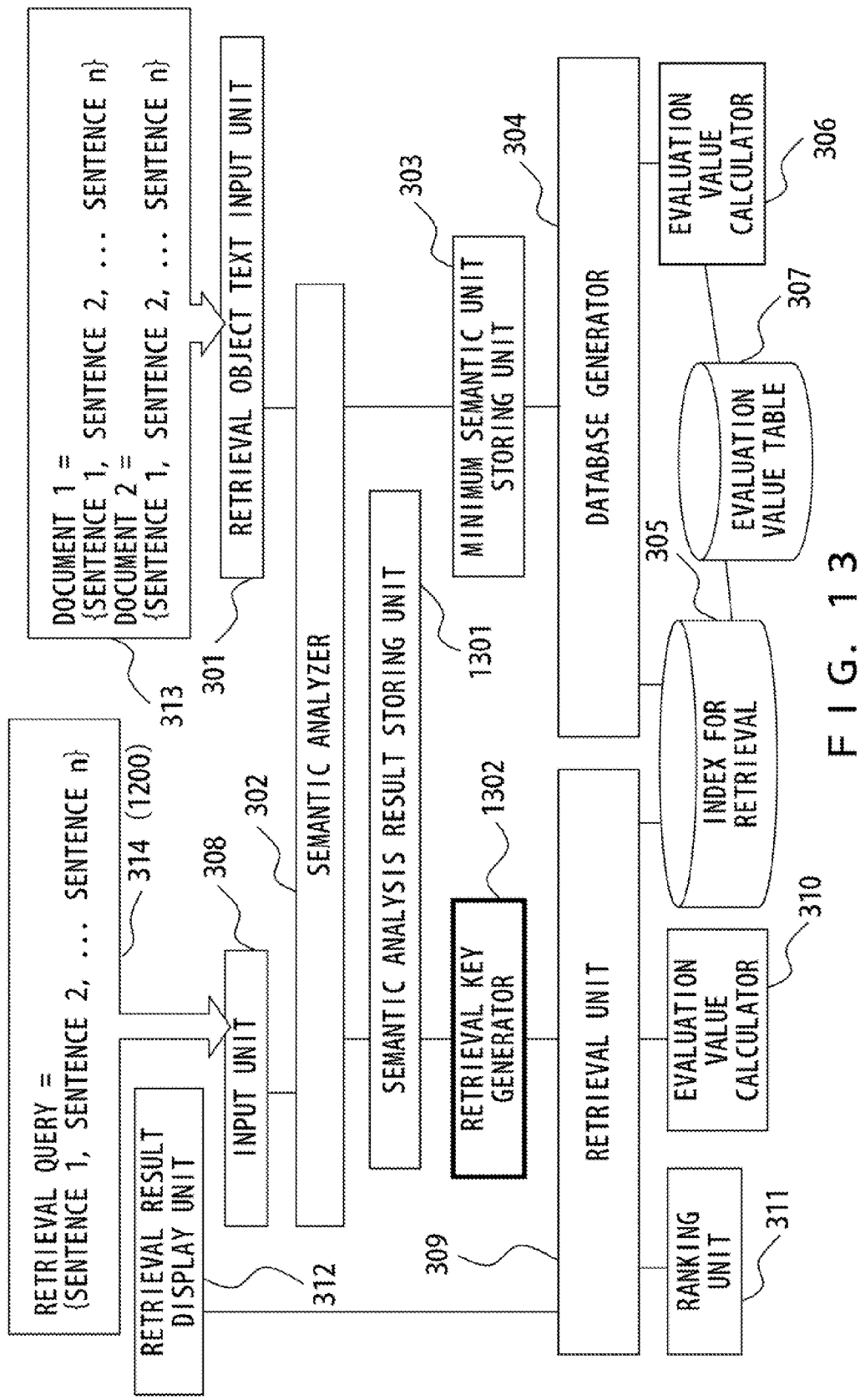
FIG. 13 illustrates a configuration of a retrieval device according to the present embodiment.

FIG. 13 illustrates a configuration of a retrieval device according to the present embodiment. The same numbers are assigned to portions having the same functions as those in the configuration of the retrieval device using a basic semantic retrieval technology illustrated in FIG. 3. Portions of the configuration in FIG. 13 that are different from the configuration in FIG. 3 are a semantic analysis result storing unit 1301 and a retrieval keys generator 1302. The semantic analysis result storing unit 1301 stores a semantic structure that is a semantic analysis result in a semantic analyzer 302. In the present embodiment, at the time of retrieval, a retrieval unit 309 does not use retrieval keys as a set of minimum semantic units that are generated by the semantic analyzer 302 and are stored in the minimum semantic unit storing unit 303, as in the configuration in FIG. 3. In the present embodiment, the retrieval keys generator 1302 is included in which a semantic structure 1201 (FIG. 12) stored in the semantic analysis result storing unit 1301 is input and retrieval keys 1203 (FIG. 12) are generated. The retrieval unit 309 performs a retrieval process by using the retrieval keys 1203 generated by the retrieval keys generator 1302.

In the retrieval device in FIG. 13, at the time of generating a database, a retrieval object text input unit 301, a semantic analyzer 302, a minimum semantic unit storing unit 303, a database generator 304, and an evaluation value calculator 306 operate, similarly to FIG. 3. The database generation operation in the retrieval device in FIG. 13 in the present embodiment is similar to the operation described above with reference to FIG. 3 to FIG. 7.

Namely, the retrieval object text input unit 301 divides documents 313 into sentences, performs semantic analysis on each of the sentences using the semantic analyzer 302 so as to generate minimum semantic units, and stores the minimum semantic units in the minimum semantic unit storing unit 303. The database generator 304 generates an index for retrieval 305 on the basis of the minimum semantic units stored in the minimum semantic unit storing unit 303. In addition, the evaluation value calculator 306 calculates in advance an evaluation value of an appearance frequency of each of the minimum semantic units registered in the index for retrieval 305, and stores the evaluation value in the evaluation value table 307.

Figure 14:
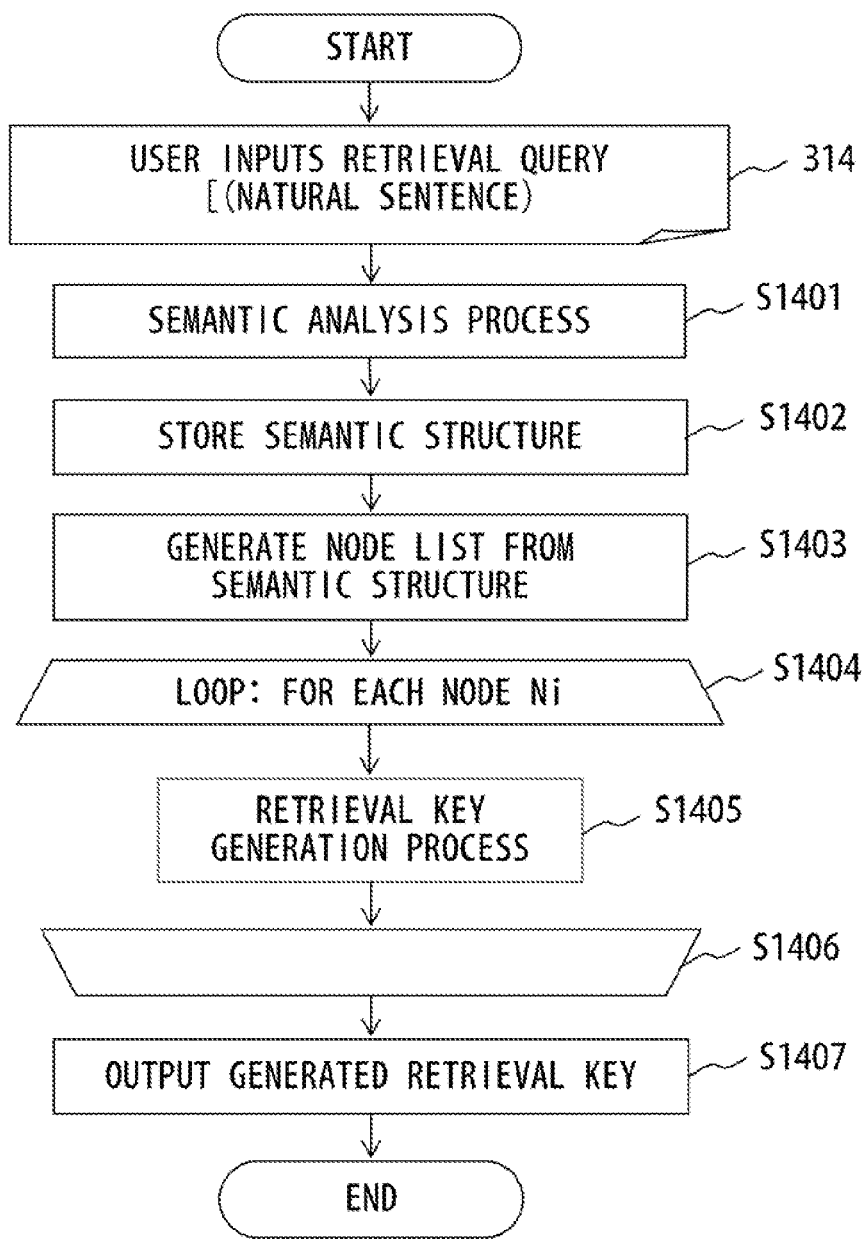
FIG. 14 is a flowchart illustrating a control process for the retrieval key generation according to the present embodiment.

FIG. 14 is a flowchart illustrating a control process for generating retrieval keys in the present embodiment.

First, a semantic analysis process is performed on a retrieval query 314 input by a user, and the semantic structure 1201 (see FIG. 12) is generated (step S1401).

Then, the semantic structure 1201 obtained as a result of the semantic analysis process of step S1401 is stored (step S1402).

The processes above of steps S1401 and S1402 correspond to the functions of the input unit 308, the semantic analyzer 302, and the semantic analysis result storing unit 1301 in FIG. 13.

Figure 15:
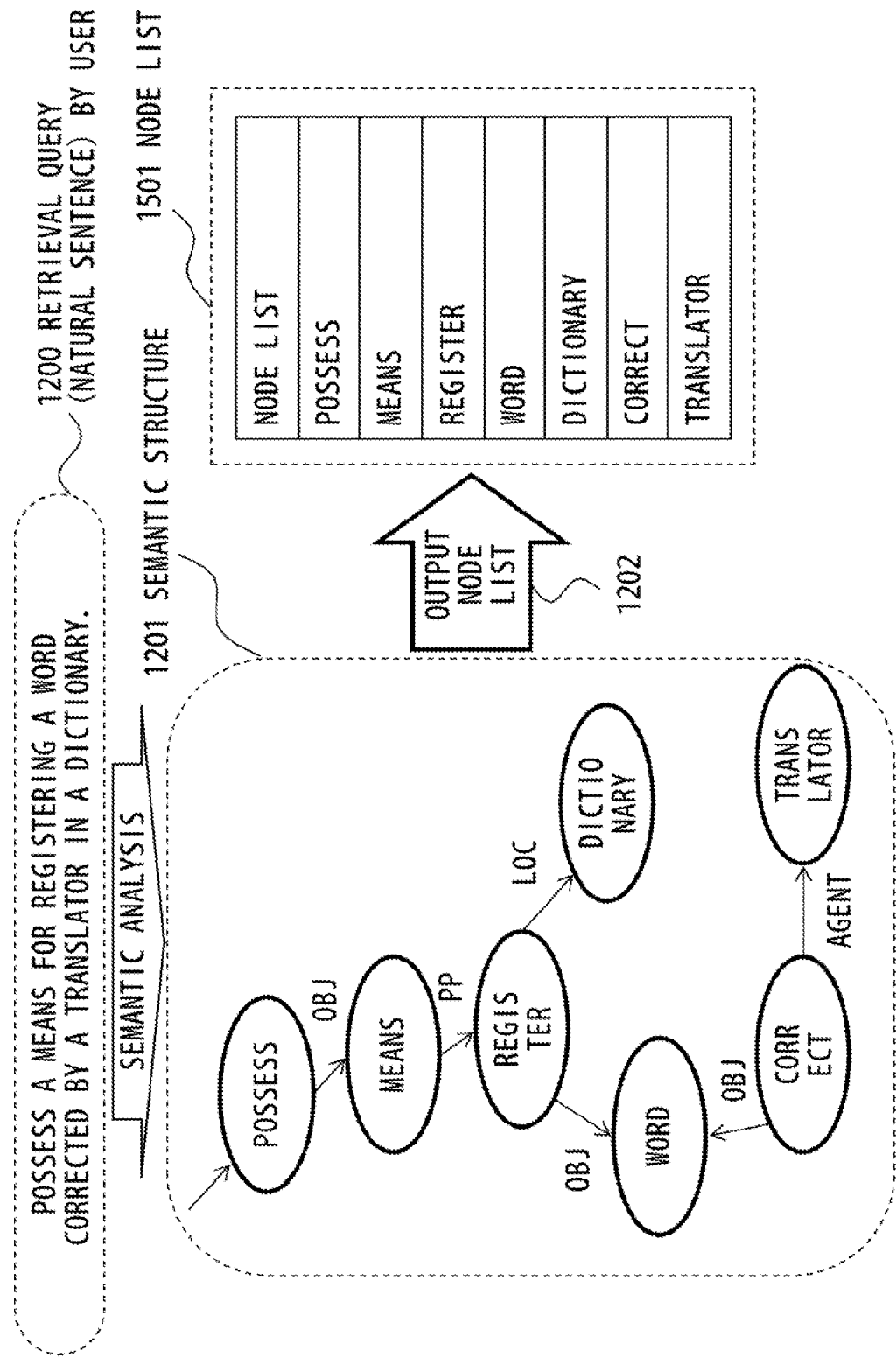
FIG. 15 is a diagram explaining a process of generating a node list.

Then, a node list is generated from the semantic structure 1201 stored in the semantic analysis result storing unit 1301 (step S1403). FIG. 15 is a diagram explaining a process of generating the node list. Here, a list (node list) 1501 included in the semantic structure 1201 is generated. When the description is given by using an example in FIG. 15, semantic analysis is performed on a natural sentence of the retrieval query 1200 input by a user, e.g., "possess a means for registering a word corrected by a translator in a dictionary", and the semantic structure 1201 is calculated. Nodes included in the semantic structure 1201 are listed below.

POSSESS
MEANS
REGISTER
WORD
DICTIONARY
CORRECT
TRANSLATOR

Then, by a loop process under the control of steps S1404 and S1406, a retrieval target process is performed on each of the nodes (hereinafter referred to as a "node Ni") in the node list 1501 (step S1405).

By a loop process of steps S1404-S1406, when retrieval keys 1203 (see FIG. 12) are generated for all of the nodes, the generated retrieval keys 1203 are output (step S1407).

Figure 16:
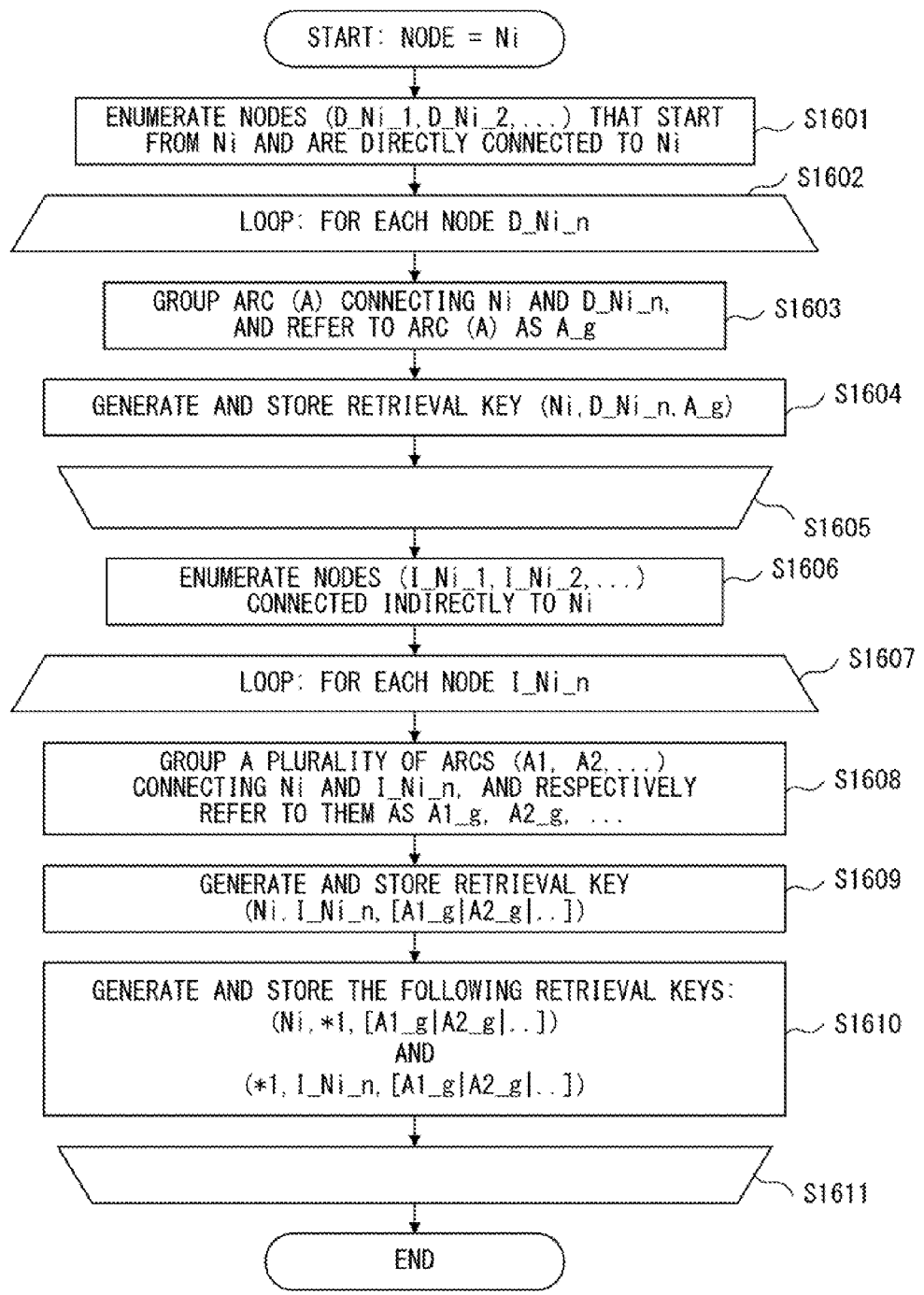
FIG. 16 is a flowchart illustrating retrieval target process according to the present embodiment.

FIG. 16 is a flowchart illustrating a retrieval target process in step S1405 of FIG. 14.

The description below is given by using the node "MEANS" in the node list 1501 generated in the example in FIG. 15 as an example (node Ni="MEANS").

When the semantic structure 1201 stored in the semantic analysis result storing unit 1301 is referred to, nodes (D_Ni_1, D_Ni_2, . . . ) connected directly from the node Ni are enumerated (step S1601). In the example in FIG. 15, nodes connected directly from the node Ni (="MEANS") as a starting point are enumerated to find one node as provided below.

D_Ni_1="REGISTER"

The node "POSSESS" is directly connected to the node "MEANS" with the node "POSSESS" as the staring point, and therefore the node "POSSESS" is not the target.

By a loop process under the control of steps S1602 and S1605, the following process is performed on each of the direct connection nodes D_Ni_n (n=1, 2, . . . ).

First, an arc connecting the node Ni and the direction connection nodes D_Ni_n (hereinafter referred to as an "arc (A)") is grouped. An arc obtained by grouping the arc (A) is referred to as A_g (step S1603). The grouping is described later.

Then, "(Ni,D_Ni_A_g)" are generated as retrieval keys 1203 (FIG. 12) and stored (step S1604).

A specific example of a loop process of steps S1603 and S1604 is given below.

<First loop: D_Ni_1>

An arc connecting the node Ni (="MEANS") and the node D_Ni_1 is "PP" in the semantic structure 1201 of FIG. 15. In step S1603, "PP" is grouped so as to be "PP_GROUP". FIG. 17 illustrates an example of a correspondence relationship between an arc name and a group name. This diagram illustrates that "PP" is grouped so as to be "PP_GROUP".

In step S1604, retrieval keys (MEANS, REGISTER, PP_GROUP) are generated and stored.

<Loop End>

Then, the semantic structure 1201 stored in the semantic analysis result storing unit 1301 is referred to, and nodes (I_Ni_1, I_Ni_2, . . . ) connected indirectly to the node Ni are enumerated (step S1606). The indirect connection is defined to not be connected directly but to be connected via n arcs. n is set in a system, and a plurality of arcs may be set such that n is 2 or more, e.g., [n=2, 3, or 4]. Assume that a direction of an arc is ignored. Here, assume that n=2.

Next, by a loop process under the control of steps S1607 and S1611, the following process is performed on each of the indirect connection nodes I_Ni_n (n=1, 2 . . . ).

First, a plurality of arcs connecting the node Ni and the indirect connection nodes I_Ni_n (hereinafter referred to as "arc A1", "arc A2" . . . ) are grouped. The grouped arcs are referred to as "A1 g" and "A2_g" (step S1608). The grouping is described later.

Then, "(Ni,I_Ni_[A1_g|A2_g| . . . ])" are generated as retrieval keys 1203 (FIG. 12) and stored (step S1609).

Further, as retrieval keys 1203 (FIG. 12), the following are generated and stored (step S1610).

(Ni,*1,[A1_g|A2_g| . . . ]) AND (*1,I_Ni_n,[A1_g| A2_g| . . . ])

A specific example of a loop process of steps S1608-S1610 is described below.

First, in the semantic structure 1201 illustrated in FIG. 15, nodes connected indirectly to the node Ni (="MEANS") are enumerated (step S1606). In FIG. 15, nodes connected indirectly to "MEANS" are the node "WORD" connected from "MEANS" via arcs "PP" and "OBJ" and the node "DICTIONARY" connected via arcs "PP" and "LOC". Accordingly, the nodes are as given below.

I_Ni_1="WORD"
I_Ni_2="DICTIONARY"

A loop process of steps S1607-S1611 is performed on each I_Ni_n.

<First loop: I_Ni_1>

The arcs "PP" and "OBJ" connecting the node Ni (="MEANS") and the indirect connection node I_Ni_1 are respectively grouped so as to be "PP_GROUP" and "OBJ_GROUP" (step S1608). The grouping is illustrated in FIG. 17.

As retrieval keys 1203, "(MEANS, WORD, [PP_GROUP|OBJ_GROUP])" are generated and stored (step S1609).

Further, as retrieval keys 1203, the following retrieval keys are generated and stored (step S1610).

(MEANS,*1,[PP_GROUP|OBJ_GROUP])AND(*1, WORD,[PP_GROUP|OBJ_GROUP])

Figure 18A:
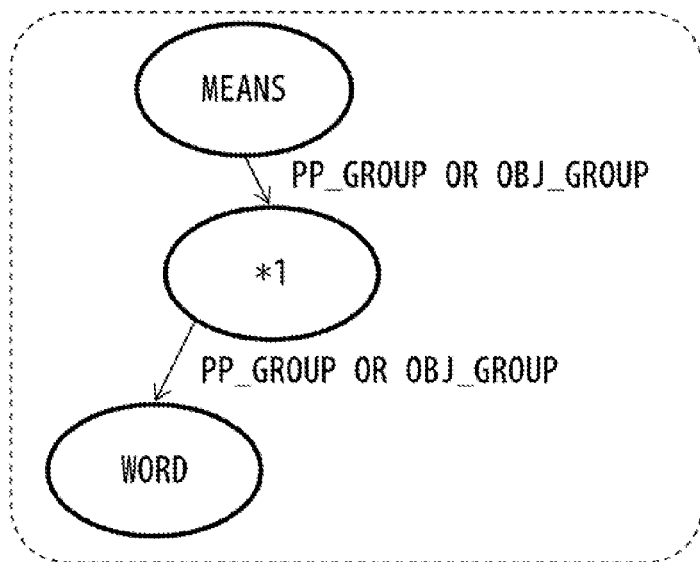
FIGS. 18A and 18B are diagrams explaining an indirect connection.
Figure 18B:
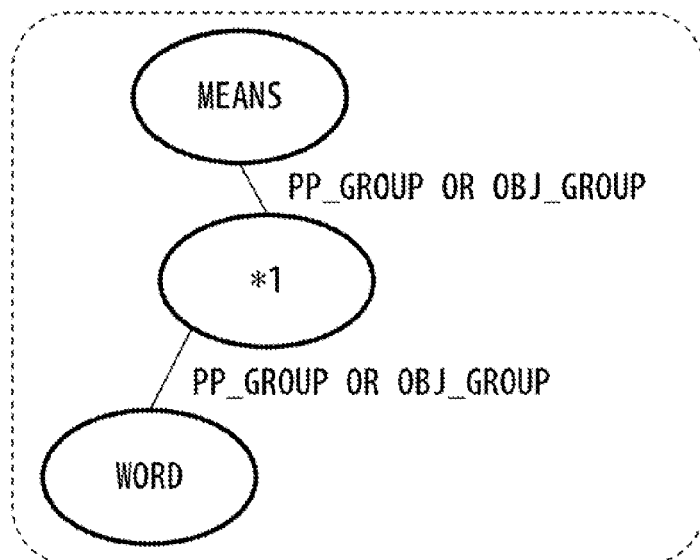

The retrieval expression above refers to retrieving a structure in which MEANS is connected to WORD via the same one node, as illustrated in, for example, FIG. 18A. A direction of an arc does not always need to be specified. A case in which the direction of the arc is not specified is illustrated in FIG. 18B.

<Second loop: I_Ni_2>

The arcs "PP" and "LOC" connecting the node Ni (="MEANS") and the indirect connection node I_Ni_2 are respectively grouped so as to be "PP_GROUP" and "PLACE_GROUP" (step S1608). The grouping above is illustrated in FIG. 17.

As retrieval keys 1203, "(MEANS,DICTIONARY,[PP_GROUP|PLACE_GROUP])" are generated and stored (step S1609).

Further, as retrieval keys 1203, the following retrieval keys are generated and stored (step S1610).

(MEANS,*1,[PP_GROUP|PLACE_GROUP])
AND
(*1,DICTIONARY,[PP_GROUP|PLACE_GROUP])

<Loop End>

Due to the above process, the retrieval target process in step S1405 of FIG. 14 to one node Ni is finished, as illustrated in the flowchart of FIG. 16.

Retrieval keys generated for each node Ni by the loop process of step S1404-S1407 as described above is output, at step S1407 in FIG. 14, to the retrieval unit 309 in FIG. 13, and the control process for generating retrieval keys is finished.

In the above description, the arc is grouped as illustrated in FIG. 17 in step S1603 or step S1608. An arc indicates a role of expressing the meaning of a sentence. For example, OBJ and OBJ A refer to an object, and arcs are classified finely in a semantic analysis process. In the present embodiment, in order to improve a hit rate of retrieval, arcs indicating a similar relationship from among finely classified arcs are grouped as illustrated in, for example, FIG. 17.

The processes above of steps S1403-S1407 correspond to a function of the retrieval keys generator 1302 in FIG. 13.

For example, an output of retrieval keys 1203 of the node Ni="MEANS" as an example illustrated in FIG. 15 is of the following five types.

1. (MEANS,REGISTER,PP_GROUP)
2. (MEANS,WORD,[PP_GROUP|OBJ_GROUP])
3. (MEANS,*1,[PP_GROUP|OBJ_GROUP])
AND
(*1,WORD,[PP_GROUP|OBJ_GROUP])
4. (MEANS,DICTIONARY,[PP_GROUP|PLACE_GROUP])
5. (MEANS,*1,[PP_GROUP|PLACE_GROUP])
AND
(*1,DICTIONARY,[PP_GROUP|PLACE_GROUP])

In the retrieval unit 309 in FIG. 13 that received the output of the retrieval keys 1203 described above, a portion indicating a grouped arc in a retrieval element corresponding to each of the minimum semantic units included in the retrieval keys 1203 may be processed, for example, as described below. The retrieval unit 309 receives a table illustrated in, for example, FIG. 17 from the retrieval keys generator 1302. The retrieval unit 309 refers to the table, and decomposes a grouped arc in each OR-connected portion in the retrieval keys 1203 into respective arcs belonging to the group. The retrieval unit 309 generates a minimum semantic unit from each of the arcs obtained by the decomposition and a portion other than the arc portion, and performs matching with the minimum semantic units in the index for retrieval 305. Here, the retrieval unit 309 performs wildcard retrieval to a node portion indicated by an asterisk "*". The wildcard retrieval refers to retrieval on conditions that a node in a prescribed portion may be an arbitrary node. Alternatively, at the time of database generation, an arc of each of the minimum semantic units in the index for retrieval 305 may be replaced with a grouped arc, and matching may be performed with each grouped arc in the retrieval keys 1203.

The present embodiment described above enables reducing the number of retrieval keys that are garbage, retrieving even a sentence having a similar implication, and improving the retrieval performance by generating retrieval keys that match a document to be matched.

As an example, when combinations of two arbitrary nodes are generated for the query "possess a means for registering a word corrected by a translator in a dictionary", a document that is not desired to be matched is matched. Described below are examples of undesired retrieval keys.

(CORRECT,DICTIONARY,*) "correct a dictionary", "the correction of a dictionary", "a corrected dictionary", "a correction dictionary" . . .

(MEANS,POSSESS,*) "a possession means", "a means for possessing" . . .

(POSSESS,DICTIONARY,*) "possess a dictionary", "the possession of a dictionary" . . .

(REGISTER,TRANSLATOR,*) "a translator registers", "register a translator" . . .

The present embodiment enables controlling of undesired retrieval keys as described above to not be generated.

In the above description of the embodiment, an indirect connection is defined as a connection of nodes connected via n arcs (n is fixed); however, the retrieval keys generator 1302 may define a retrieval unit of an indirect connection in accordance with the results of semantic analysis by the semantic analyzer 302 in FIG. 13.

FIGS. 19A and 19B are diagrams explaining another control method of an indirect connection, and FIG. 19A illustrates an example of a configuration of a table for controlling how many steps of the development are performed so as to generate retrieval keys when a part of speech of a node and an arc are combined. In this example, a "node 2" refers to a node that an arc reaches. When another arc starts from the node 2, it is determined according to a group of the arc whether the development can be performed.

For example, in FIG. 19B, when the node "MEANS" is a starting point, a node 2 is "REGISTER", and this node has an attribute of a verb. An arc that starts from "REGISTER" is PP_GROUP. In the control table of FIG. 19A, possibility of expansion of a verb attribute and PP_GROUP is "possible", and "WORD" that the arc reaches is connected indirectly to "MEANS".

Then, "WORD" is a node that is reached by an indirect connection, and therefore "WORD" also becomes a "node 2". "WORD" has a noun attribute, and the arc "PP_GROUP" starts from "WORD". According to FIG. 19A, possibility of expansion of a noun attribute and "PP_GROUP" is "impossible", and therefore a subsequent node "XYZXYZ" is not connected indirectly to the first starting point "MEANS".

As described above, it is possible to determine up to which node the indirect connection is made, in accordance with an attribute of a node reached by the arc and the type of an arc starting from the node reached by the arc.

Figure 20:
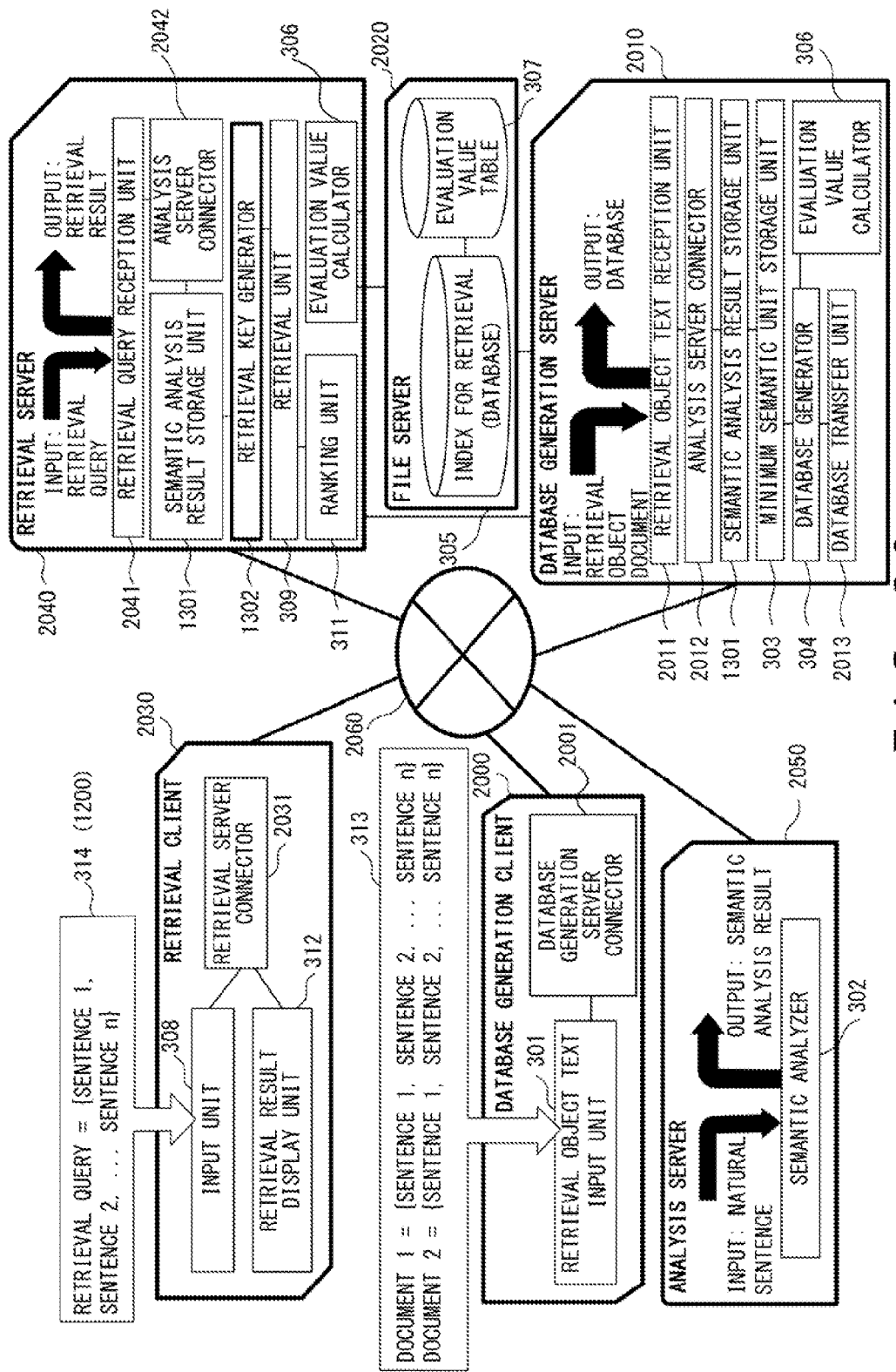
FIG. 20 illustrates an example of a configuration of an embodiment corresponding to a cloud configuration.

FIG. 20 illustrates an example of a configuration of an embodiment corresponding to a cloud configuration. The configuration is an example of a retrieval system.

The configuration includes a database generation client 2000, a database generation server 2010, a file server 2020, a retrieval client 2030, a retrieval server 2040, an analysis server 2050, and a network 2070 connecting these devices. FIG. 20 illustrates a configuration in which components in the embodiment illustrated in FIG. 13 are arranged so as to be distributed in each of the servers described above. In FIG. 20, the same numerals are assigned to portions having the same function as that in FIG. 13. The analysis server 2050 is an example of a first computer. The retrieval server 2040 is an example of a second computer.

At the time of generating a database, when a user that is the database generation client 2000 inputs all of the documents 313 to be stored in the database, the retrieval object text input unit 301 similar to that in FIG. 13 receives all of the documents 313. Then, a database generation server connector 2001 in the database generation client 2000 connects to the database generation server 2010. In the database generation server 2010, a retrieval object text reception unit 2011 receives the documents 313 from the database generation client 2000. In the database generation server 2010, an analysis server connector 2012 connects to the analysis server 2050. As a result, the semantic analyzer 302 in the analysis server 2050 performs a semantic analysis process on the documents 313 received by the database generation server 2010. Pieces of data of minimum semantic units that are results of the semantic analysis process are transmitted from the analysis server 2050 to the database generation server 2010. In the database generation server 2010, the analysis server connector 2012 receives each piece of data of the minimum semantic unit and stores the piece of data in the minimum semantic unit storing unit 303. In the data generation server 2010, the database generator 304 generates the index for retrieval 305 on the basis of the minimum semantic unit for each of the documents 313 stored in the minimum semantic unit storing unit 303. In addition, the evaluation value calculator 306 calculates an evaluation value of an appearance frequency for each of the minimum semantic units registered in the index for retrieval 305, and generates the evaluation value table 307. A database transfer unit 2013 transfers the index for retrieval 305 and the evaluation value table 307 described above to the file server 2020.

At the time of retrieving a database, a user that is the retrieval client 2030 designates a retrieval query 1200 (see FIG. 12). The retrieval query 1200 is received by an input unit 308 in the retrieval client 2040. In the retrieval client 2030, a retrieval server connector 2031 connects to the retrieval server 2040, and transmits the received retrieval query 1200 to the retrieval server 2040. In the retrieval server 2040, a retrieval query reception unit 2041 receives the retrieval query 1200 from the retrieval client 2030. In the retrieval server 2040, an analysis server connector 2042 connects to the analysis server 2050. As a result, a semantic analyzer 302 in the analysis server 2050 performs a semantic analysis process on the retrieval query 1200 received by the retrieval server 2040. Data of a semantic structures 1201 (see FIG. 12) that is a result of the semantic analysis process is transmitted from the analysis server 2050 to the retrieval server 2040. In the retrieval server 2040, the analysis server connector 2042 receives the data of the semantic structure 1201, and stores the data in a semantic analysis result storing unit 1301. In the retrieval server 2040, retrieval keys generator 1302 generates retrieval keys 1203 (see FIG. 12) on the basis of the semantic structure 1201 stored in the semantic analysis result storing unit 1301, and outputs the retrieval keys 1203 to a retrieval unit 309. The retrieval unit 309 retrieves the index for retrieval 305 in the file server 2020, and receives a retrieval result. Further, an evaluation value calculator 306 in the retrieval server 2040 refers to the evaluation value table 307 in the file server 2020 so as to calculate an evaluation value for each of the documents retrieved by the retrieval unit 309. The ranking unit 311 in the retrieval server 2040 ranks the documents that are retrieval results on the basis of the calculation result of the evaluation value by the evaluation value calculator 306. The retrieval unit 309 returns the ranked documents that are the retrieval results to the retrieval client 2030. In the retrieval client 2030, the retrieval server connector 2031 receives the ranked documents that are the retrieval results, and displays the documents on a retrieval result display unit 312.

In the cloud configuration described above, the generation, retrieval, and storage of a database and an accompanying semantic analysis process can be effectively performed by a dispersion process via the network 2060, such as the internet.

FIG. 21 illustrates an example of a hardware configuration of a computer realizing the entirety or a portion of the system described above as a software process.

A computer illustrated in FIG. 21 includes a CPU 2101, a memory 2102, an input device 2103, an output device 2104, an external storage device 2105, a portable storage medium driving device 2106 into which a portable storage medium 2109 is inserted, and a communication interface 2107, and these components are connected to each other via a bus 2108. The configuration illustrated in FIG. 21 is an example of the computer realizing the system described above, and the computer is not limited to this configuration.

The CPU 2101 controls the entirety of the computer. The memory 2102 is a memory, such as a RAM, that temporarily stores a program or data stored in the external storage device 2105 (or the portable storage medium 2109) at the time of the execution of the program, the updating of the data, or the like. The CPU 2101 reads the program to the memory 2102 and executes the program so as to control the entirety of the computer.

The input device 2103 detects an input operation by a user using a keyboard, a mouse, or the like, reports a detection result to the CPU 2101, and outputs data transmitted under the control of the CPU 2101 to a display device or a printing device.

The external storage device 2105 is, for example, a hard disk storage device. The external storage device 2105 is mainly used for the storage of various types of data or programs.

The portable storage medium driving device 2106 accommodates the portable storage medium 2109, such as an optical disk, an SDRAM, or a compact flash, and functions as an auxiliary of the external storage device 2105.

The communication interface 2107 is a device that connects a communication line of, for example, a LAN (Local Area Network) or a WAN (Wide Area Network).

The system according to the present embodiment may be realized by executing, by the CPU 2101, a program with a function realized in the flowcharts of FIG. 14 and FIG. 15, or the like. The program may be stored in, for example, the external storage device 2105 or the portable storage medium 2109 and be distributed, or the program may be obtained from the network by a communication interface 2107.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A retrieval device comprising:
a processor that
   performs semantic analysis on a query and generates one or more semantic structures where each structure is expressed by a graph;
   generates retrieval keys corresponding to combinations of nodes connected directly or indirectly in the semantic structures and corresponding to minimum units of semantic connections between nodes in the generated semantic structures; and
   retrieves relevant documents whose sentences are matched to combinations of nodes, by using the generated retrieval keys, in the semantic structures stored in an index for retrieval on a database storing the documents.

2. The retrieval device according to claim 1, wherein the processor generates retrieval keys in which arcs existing in the combinations of the nodes connected indirectly are OR-connected.

3. The retrieval device according to claim 2, wherein the processor performs matching with the combinations of the nodes in the index for retrieval including each of the OR-connected arcs corresponding to the combinations of the nodes in the retrieval keys.

4. The retrieval device according to claim 1, wherein the processor generates retrieval keys in which condition designation is performed by a wildcard to one node of the combinations of the nodes connected indirectly and a node existing in the combinations.

5. A retrieval device comprising:
a processor that
   performs semantic analysis on a query and generates one or more semantic structures where each structure is expressed by a graph;
   generates retrieval keys corresponding to combinations of nodes connected directly or indirectly in the semantic structures and corresponding to minimum units of semantic connections between nodes in the generated semantic structures; and
   retrieves relevant documents whose sentences are matched to combinations of nodes, by using the generated retrieval keys, in the semantic structures stored in an index for retrieval on a database storing the documents, wherein
the processor groups arcs representing a similar relationship from among arcs corresponding to the combinations of the nodes in the retrieval keys and generates the retrieval keys.

6. The retrieval device according to claim 5, wherein the processor performs matching with the combinations of the nodes in the index for retrieval including each arc belonging to the grouped arcs corresponding to the combinations of the nodes in the retrieval keys.

7. The retrieval device according to claim 5, wherein the combinations of the nodes in the index for retrieval is associated with the grouped arcs, and
the processor performs matching with the combinations of the nodes in the index for retrieval including the grouped arcs corresponding to the combinations of the nodes in the retrieval keys.

8. The retrieval device according to claim 1, wherein the processor defines an indirect connection by an attribute of the node and an attribute of an arc that starts from the node.

9. A retrieval system comprising:
a first computer; and
a second computer connected to the first computer via a network, wherein
the first computer includes a first processor that
performs semantic analysis on a query and generates one or more semantic structures where each structure is expressed by a graph, and the second computer includes a second processor that
generates retrieval keys corresponding to combinations of nodes connected directly or indirectly in the semantic structures and corresponding to minimum units of semantic connections between nodes in the semantic structures generated by the first computer, and
retrieves relevant documents whose sentences are matched to combinations of nodes, by using the generated retrieval keys, in the semantic structures stored in an index for retrieval on a database storing the documents.

10. A retrieval method comprising:
performing, by a processor, semantic analysis on a query and generating one or more semantic structures where each structure is expressed by a graph;
generating, by the processor, retrieval keys corresponding to combinations of nodes connected directly or indirectly in the semantic structures generated by the semantic analysis and corresponding to minimum units of a semantic connection between nodes in the generated semantic structures; and
retrieving, by the processor, relevant documents whose sentences are matched to combinations of nodes, by using the generated retrieval keys, in the semantic structures stored in an index for retrieval on a database storing the documents.

11. A computer-readable recording medium having stored therein a program for causing a computer to execute a process comprising:
performing semantic analysis on a query and generating one or more semantic structures where each structure is expressed by a graph;
generating retrieval keys corresponding to combinations of nodes connected directly or indirectly in the semantic structures generated by the semantic analysis and corresponding to minimum units of a semantic connection between nodes in the generated semantic structures; and
retrieving relevant documents whose sentences are matched to combinations of nodes, by using the generated retrieval keys, in the semantic structures stored in an index for retrieval on a database storing the documents.

* * * * *